US012539482B2

(12) United States Patent
Sanfilippo et al.

(10) Patent No.: US 12,539,482 B2
(45) Date of Patent: Feb. 3, 2026

(54) SYSTEM FOR ASEPTIC PACKAGING AND METHOD OF USING THE SAME

(71) Applicant: SANFILIPPO TECH, LLC., Schaumburg, IL (US)

(72) Inventors: John Sanfilippo, Schaumburg, IL (US); James J. Sanfilippo, Schaumburg, IL (US)

(73) Assignee: SANFILIPPO TECH, LLC., Schaumburg, IL (US)

( * ) Notice: Subject to any disclaimer, the term of this patent is extended or adjusted under 35 U.S.C. 154(b) by 468 days.

(21) Appl. No.: 17/794,725

(22) PCT Filed: Jan. 27, 2021

(86) PCT No.: PCT/US2021/015340
§ 371 (c)(1),
(2) Date: Jul. 22, 2022

(87) PCT Pub. No.: WO2021/154894
PCT Pub. Date: Aug. 5, 2021

(65) Prior Publication Data
US 2023/0056299 A1    Feb. 23, 2023

Related U.S. Application Data

(60) Provisional application No. 62/966,519, filed on Jan. 27, 2020.

(51) Int. Cl.
*B65B 31/00* (2006.01)
*B01D 46/00* (2022.01)

(52) U.S. Cl.
CPC ...... *B01D 46/0041* (2013.01); *B01D 2279/51* (2013.01)

(58) Field of Classification Search
CPC ....... B65B 55/027; B65B 31/02; B65B 55/00; B65B 37/00; A61L 2/00; A61L 2/06
(Continued)

(56) References Cited

U.S. PATENT DOCUMENTS 4,396,582 A * 8/1983 Kodera ............... A61L 2/18
53/167
4,734,268 A   3/1988 Redding et al.
(Continued)

FOREIGN PATENT DOCUMENTS

EP    1073586 A1   2/2001
EP    1647488 A2   4/2006
(Continued)

OTHER PUBLICATIONS

International Application No. PCT/US2021/015340, International Search Report and Written Opinion, mailed Jul. 5, 2021.
(Continued)

*Primary Examiner* — Monzer R Chorbaji
(74) *Attorney, Agent, or Firm* — MARSHALL, GERSTEIN & BORUN LLP

(57) ABSTRACT

Systems and methods of aseptic processing of product can include a hopper for introduction of the product into the system and one or more components through which the product flows as it is processed through the system, an enclosure surrounding one more of the components, a gassing assembly comprising a plurality of gassing elements for maintaining a substantially constant flow of inert gas over the product as it travels through the components of the system, and filtered gas recirculation system that recirculates filtered air or gas through the enclosure. Such systems can be particularly advantageous for use in the cannabis industry.

12 Claims, 19 Drawing Sheets

(58) Field of Classification Search
USPC ....... 422/24, 307, 309; 222/152; 141/47, 67; 99/471
See application file for complete search history.

(56) References Cited

U.S. PATENT DOCUMENTS

| | | | | |
|---|---|---|---|---|
| 5,270,000 | A | * | 12/1993 | Goldner ................ B09B 3/0075 34/264 |
| 7,850,904 | B2 | * | 12/2010 | Osato ...................... B01J 19/20 34/411 |
| 2006/0075721 | A1 | | 4/2006 | Monti |
| 2009/0249744 | A1 | | 10/2009 | Tacchini |
| 2010/0178401 | A1 | | 7/2010 | Van Appeldoorn et al. |

FOREIGN PATENT DOCUMENTS

| | | |
|---|---|---|
| EP | 1905694 A1 | 4/2008 |
| GB | 2086834 A | 5/1982 |
| WO | 95/31375 A1 | 11/1995 |
| WO | 99/54208 A1 | 10/1999 |
| WO | 2007/119143 A1 | 10/2007 |
| WO | 2015/169972 A1 | 11/2015 |
| WO | 2018/025126 A1 | 2/2018 |

OTHER PUBLICATIONS

International Application No. PCT/US2021/015340, International Preliminary Report on Patentability, mailed Aug. 11, 2022.
European Patent Application No. 21707508.4, Communication Pursuant to Article 94(3) EPC, dated Mar. 6, 2025.

* cited by examiner

SYSTEM FOR ASEPTIC PACKAGING AND METHOD OF USING THE SAME

CROSS-REFERENCE TO RELATED APPLICATION

This is the U.S. national phase of International Application No. PCT/US21/15340, which claims the benefit of U.S. Provisional Application No. 62/966,519 filed Jan. 27, 2020, and the disclosure of which are each incorporated herein by reference in their entireties.

BACKGROUND

Field of the Disclosure

Disclosed herein is an apparatus for packaging of products and methods of using the same, and, in particular, to an apparatus for aseptic or substantially aseptic handling and packaging of products and methods of using the same.

Brief Description of Related Technology

Bag fillers are used in a variety of industries for bulk packaging of various products such as food and agricultural products, building and industrial materials, and chemical powders and granules. In some applications, such as in the packaging of food, pharmaceutical, and agricultural products, aseptic or substantially aseptic conditions are necessary. Often, these conditions are achieved by packaging the products in a dedicated clean room facility. Such clean room facilities require high start-up costs and dedicated space requirements to implement the necessary ventilation and airflow throughout the space. Further, restrictions on personal entering a clean room facility and pre-entry cleaning protocols require further training and may limit the number of personal that can enter the clean room during a given production run.

For some industries, such as the cannabis industry, there is limited capacity on grow sites and an inability to arrange dedicated clean room space for processing the product. While sterilization methods are beginning to be implemented in such industries, the grow facilities where such sterilization and packaging occurs can have high mold and bacteria counts in the atmosphere, and recontamination of the sterilized product often occurs during post-sterilization processing of the product for bulk or other packaging. There is a need in such industries for apparatus and methods for improved handling of sterilized product for bulk and/or other downstream packaging.

SUMMARY

Embodiments of the packaging system disclosed herein can advantageously provide for improved post-sterilization processing of a sterilized product for example for bulk packaging of the sterilized product or weighing and filling of product into jars, pouches, sachets, and other packages.

DETAILED DESCRIPTION

Systems of the disclosure can receive a sterilized product and maintain aseptic or substantially aseptic processing of the product for downstream packaging. Systems of the disclosure maintain a flow of inert gas over and/or through the product as it passes through the system to maintain an aseptic environment and prevent recontamination of the product during processing through the system. Reference to flow of inert gas herein over the product should be understood to be either or both of a flow over the product or through the product. Systems in accordance with the disclosure include a gassing assembly and a plurality of gassing elements that are arranged throughout the system to maintain a flow of inert gas over the product as is travels through the system. In embodiments, the flow of inert gas is filtered inert gas. In embodiments, the flow of inert gas is HEPA filtered inert gas. In embodiments, the inert gas is nitrogen and the flow of nitrogen over the product throughout the system maintains low oxygen levels in and around the product during its progression through the system. In embodiments, the systems of the disclosure can advantageously maintain an oxygen level in the product transport path to 0.5% or less, which allows for aseptic handling of the product throughout the entire system.

Systems for aseptic handling of products disclosed herein can be particularly useful for flowable products such as powders or aggregated flowable products. In embodiments, the systems disclosed herein can be particularly useful for aseptic handling of cannabis products and the like. Any other products requiring aseptic handling can be used herein. Products can be provided to the system in pouches or in loose form. For example, the product can be contained in a sterilized pouch and removed from the sterilized pouch for entry into the system. In other embodiments, the product can be provided directly from a sterilizer into the systems of the disclosure.

Figure 9:
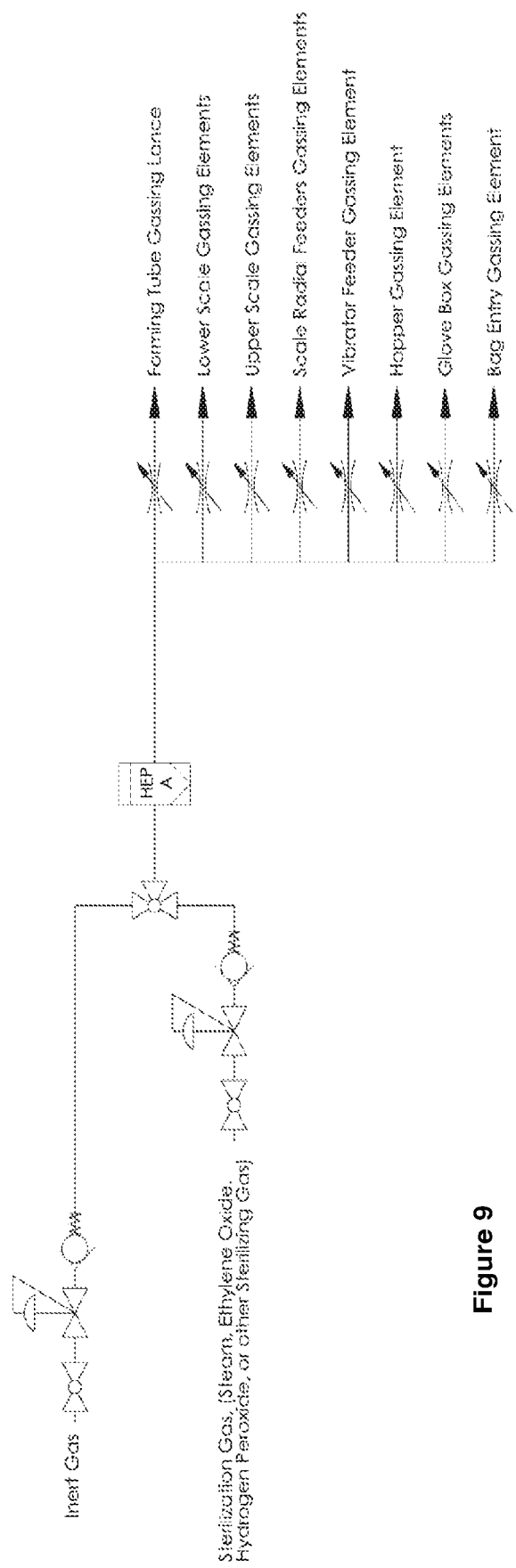
FIG. 9 is a flow diagram showing the gas flow through a system in accordance with embodiments of the disclosure.

Referring to FIG. 9, in any of the embodiments herein a gassing assembly 300 is in fluid communication with the gassing elements throughout the system. The gassing assembly controls the flow of gas to the various gassing elements of the system. The gassing assembly can include one or plurality of inlets into the system to feed gas from a gas source to the gassing elements. In any of the embodiments herein, the gassing assembly can include a filter, for example, a HEPA filter for filling the gas before entry into the gassing elements of the system. In any of the embodiments herein, the gassing assembly can be further connected to a sterilizing fluid source to allow the system to be sterilized through flow of sterilizing gas through the gassing elements and into the various components of the system. In embodiments, the gas assembly includes an inert gas input, a sterilization fluid input, a HEPA filter downstream of the inert gas input and the sterilization gas input, and a gas rail downstream of the HEPA filter to distribute the gas to the one or more gassing elements. The sterilization gas input can allow for a sterilization gas to be flowed through the system to allow for sterilization of the components of the system if needed between processing of product.

In any of the embodiments of the system or scale herein, the system can include a gas recirculation system to recirculate filtered air throughout the system to aid in removal of any contaminants that may be swept off the product by the flow of inert gas over the product in the components. For example, in embodiments, the system can include an enclosure over all or a portion of the system components. A gas recirculation element can be disposed at that upstream most portion of the enclosure to flow the filtered recirculation gas downstream throughout the system. A recirculation filter can be included and arranged such to filter the gas before it is emitted into the system by the gas recirculation element. In other embodiments, the recirculation filter can be positioned anywhere in the system, so long as the flow through the recirculation system directs the gas or air through the recirculation filter before it is emitted into the system by the recirculation elements and such that the recirculation exhaust directs the flow of the collected gas or air back to the recirculation filter. A recirculation system exhaust can be disposed downstream of the gas recirculation element to collect the gas within the enclosure as it is flowed from the gas recirculation element. The recirculation system can include multiple exhausts arranged at selected locations of the system, for example, where gassing elements within the components would be suspected to sweep potential contaminants from the product into the environment within the enclosure. The gas recirculation system has piping or other structure to maintain fluid connection between the recirculation system exhaust (or multiple exhausts if present), the recirculating filter, and the gas recirculation element to allow gas collected from the exhaust to be filtered and then recirculated into the enclosure by the recirculation element. The recirculating system can include one or more fans and/or blowers that directs the gas through the recirculating system. Any exhausted gas is always passed through the filter before recirculation into the system. The filter can be, in embodiments, a HEPA filter. During use of the system, the recirculation system can advantageously continuously sweep any contaminants, such a spores or particulates, that may enter the system with the product out of the system. In any of the embodiments herein, the gas recirculated through the system can be air present in the system and/or any inert gas exhausted by the gassing elements and present in the system. In other embodiments, the recirculation system can have an inert gas input that flows an amount of inert gas into the system for recirculation.

In embodiments, the recirculation system can be part of the gassing assembly such that the gassing assembly can direct inert gas into the recirculation system. In embodiments, the gassing assembly can be used to direct inert gas into the recirculation system. In embodiments, the gassing assembly can be used to direct sterilization fluid for cleaning/sterilization of the recirculation system. The gassing assembly can be fluidly connected to the recirculation system for sterilization only in some embodiments. In other embodiments, the recirculation system is separate from the gassing assembly. In such embodiments, the recirculation system can be fluidly connected to a separate gassing assembly for flowing inert gas and/or sterilization fluid into the recirculation system.

In embodiments, the system is for bulk packaging of the product. In embodiments, the system is for weighing and filling of the product for downstream packaging in smaller quantities. For example, the system for weighing and filling of the product can be used with any suitable packaging machine, such as vertical form fill seal machines, jar fillers, pouch fillers, and the like. In each of the systems here, the system advantageously allows for a sterilized product to be transferred into the system while substantially maintaining the sterility of the product. In embodiments, the system is a combination scale.

System for Weighing and Filling

In embodiments, the system can be for processing the product to a scale and/or for continued processing through the scale and to a downstream packaging machine. For ease of reference, such systems are referred to as systems for weighing and filling. However, the system could include any portion of the process from transport product to the scale and even processing within the scale to transfer to a packaging machine.

Figure 1:
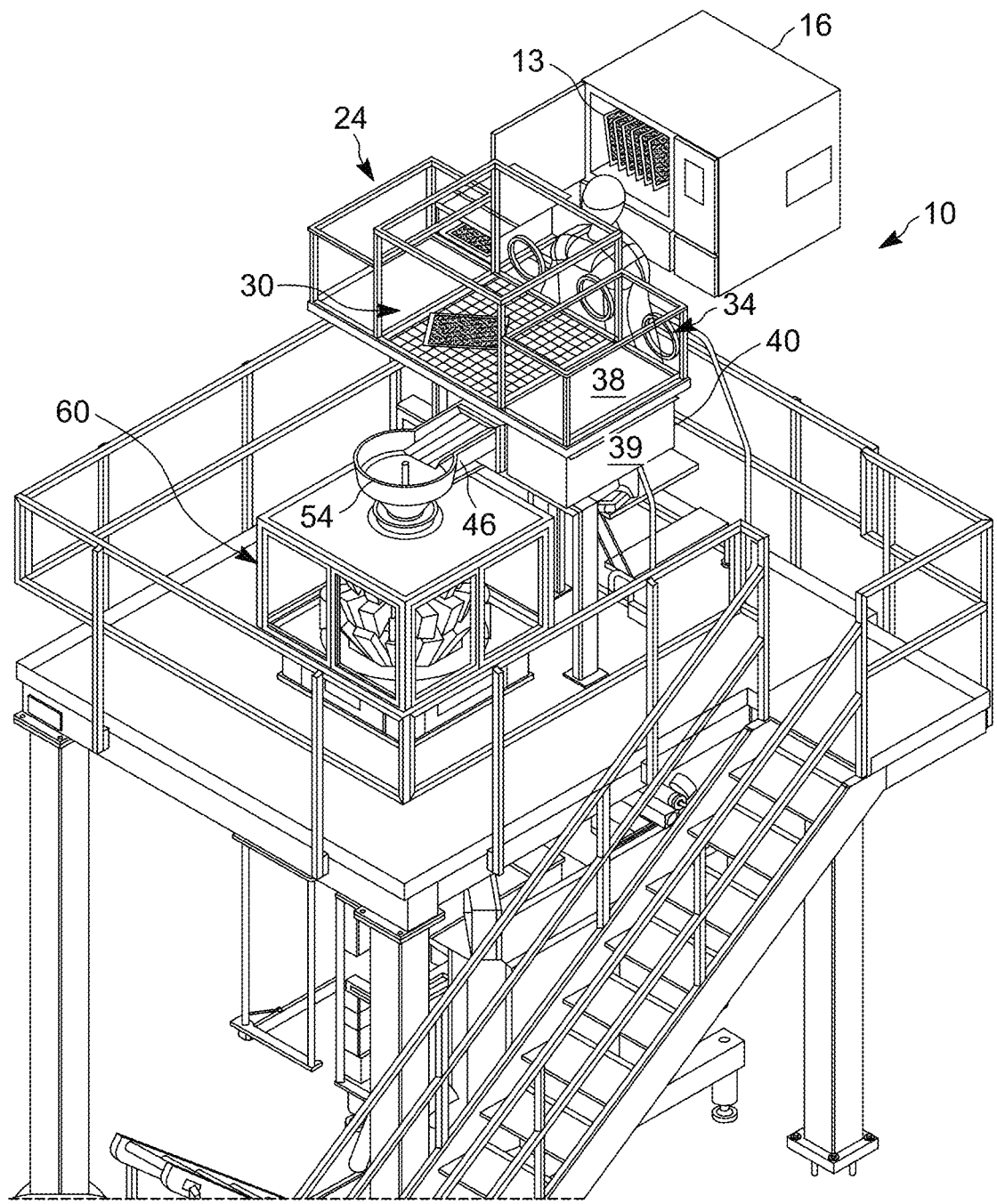
FIG. 1 is a schematic illustration of an aseptic filling system in accordance with an embodiment of the disclosure.
Figure 3:
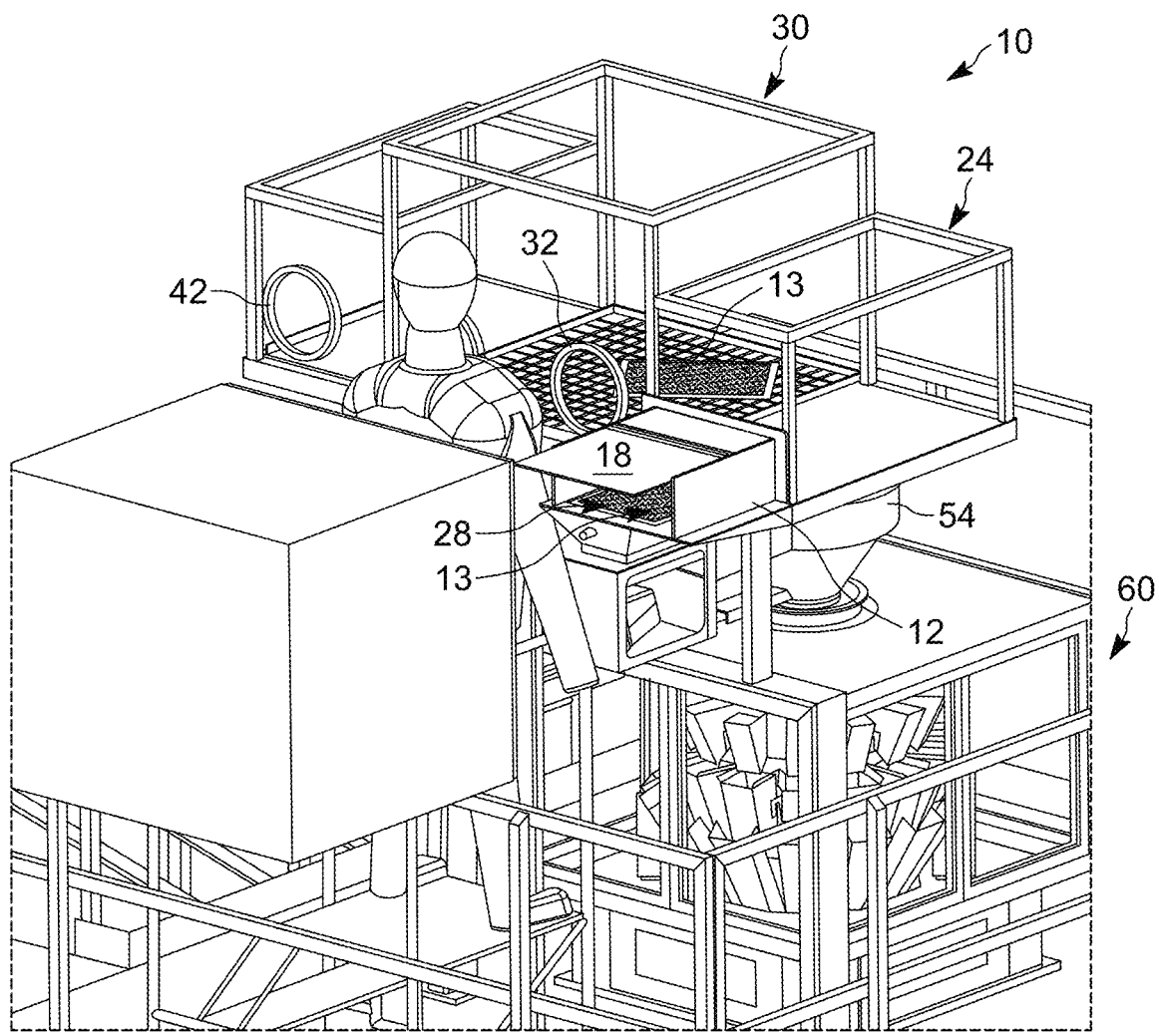
FIG. 3 is a rear perspective view of the glove box of FIG. 2.

Referring to FIGS. 1 and 3, in an embodiment, the system 10 can process a sterilized product from a sterilization unit 16 through filling of the product 14 into a scale 60 that is then connected for transfer of the measured product into a packaging machine. The systems for weighing and filling can be used with any types of scales and can advantageously interface with a variety of packaging machine types for both flexible-type packages and box, jar, can or tray type packages. The system can include one or more enclosures and a gas recirculation system as described above around all or any portion of the components.

Referring to FIG. 3, systems 10 for aseptically filling a product can, in embodiments, include a transfer receptacle 12 for receiving the sterilized product, for example, provided in a pouch 13 from a sterilization unit 16. The transfer receptacle 12 can interface with the sterilization unit 16 or can be in close proximity of the sterilization unit 16 such that product can be hand transferred into the transfer receptacle. Any other suitable arrangements or additional devices can be included for transferring product from the sterilization unit 16 to the transfer receptacle 12. For example, in embodiments in which the sterilization unit 16 is not in close proximity to the transfer receptacle, the system can further include a conveyor system (not shown) for aseptically conveying the product from the sterilization unit 16 to the transfer receptacle 12. The conveyor systems can be a sealed system and/or can include one more gassing elements for maintaining a flow of gas across the product while in the conveyor system. In embodiments, the product can be provided from the sterilization unit 16 in a sealed pouch 13 that maintains sterility of the pouch contents. In other embodiments, the sterilization unit 16 can be for sterilizing the product as loose product 14 and can be interfaced with the system 10 to deposit the loose product 14 directly into the system 10 after sterilization. Any suitable sterilization units 16 can be utilized in connection with the systems disclosed herein.

Figure 2:
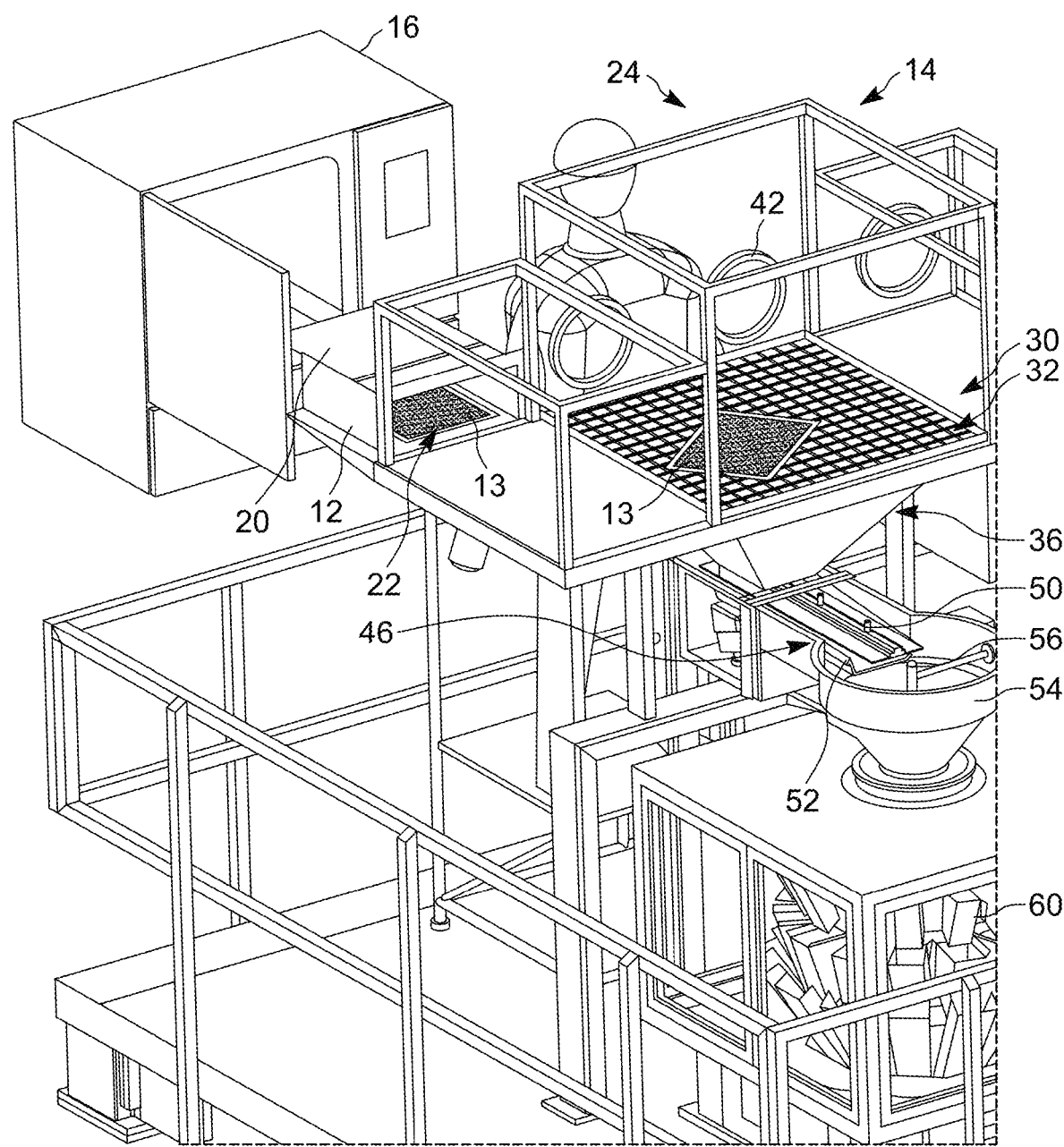
FIG. 2 is a schematic illustration of a glove box for a system in accordance with the disclosure for transfer of a sterilized product from a sterilization into a filling or packaging system.
Figure 4:
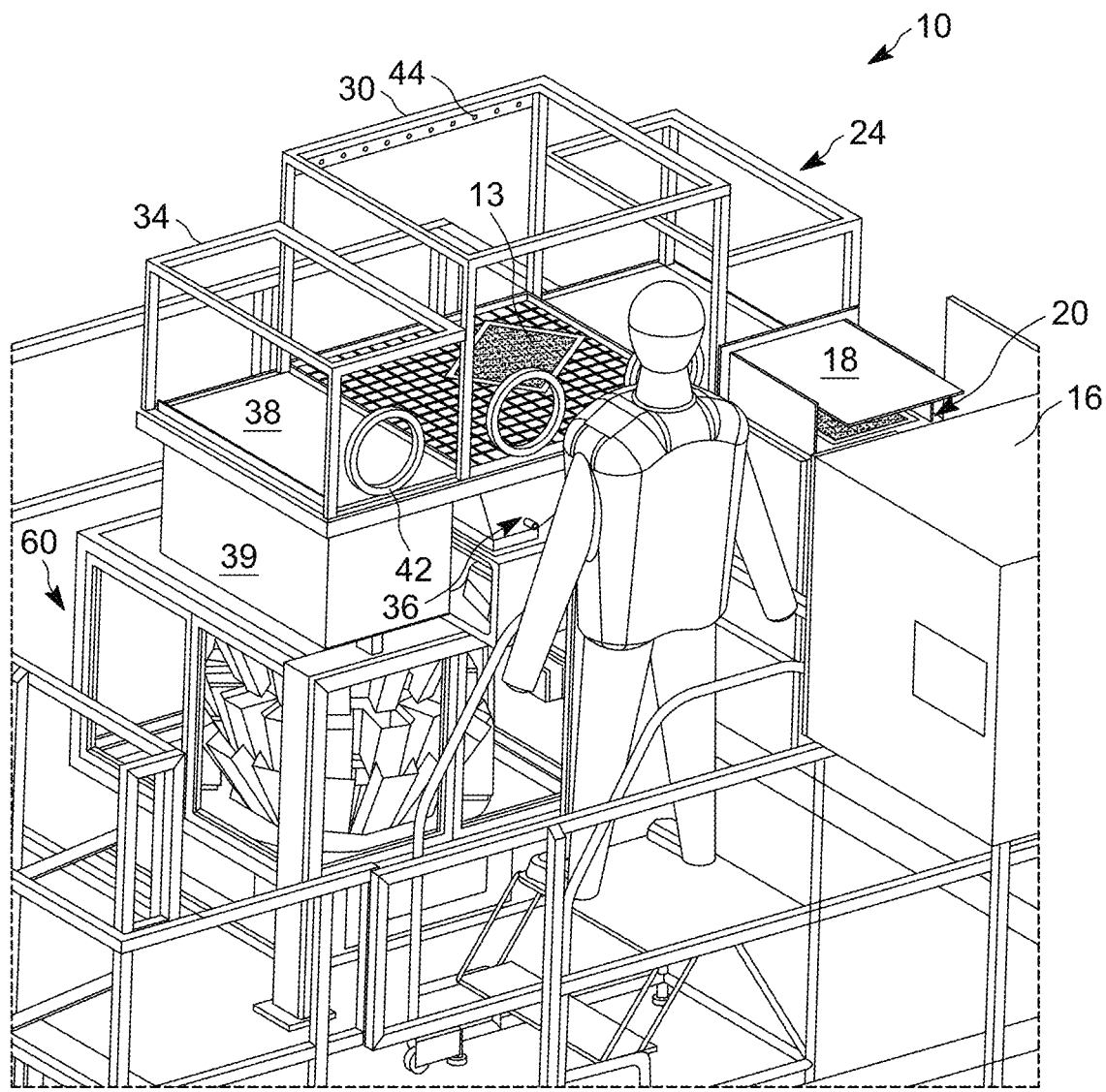
FIG. 4 is a rear view of the glove box of FIG. 2.

Referring to FIGS. 2 and 4, in embodiments, the transfer receptacle 12 includes a door 18 that seals over an opening 20 through which the product 14 or pouch 13 can be received from the sterilization unit 16. In embodiments, the door 18 can be a hinged door 18 that opens to reveal the opening 20 while the hinged end of the door recedes into the transfer receptacle 12 to limit exposure of the interior of the system during insertion of the product into the system 10 through the transfer receptacle 12.

Figure 7A:
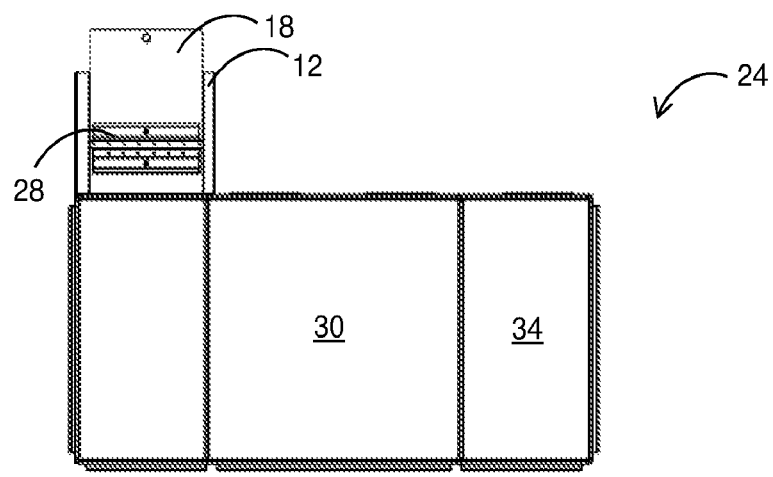
FIG. 7A is a top view of a glove box for a system in accordance with embodiments of the disclosure.
Figure 7B:
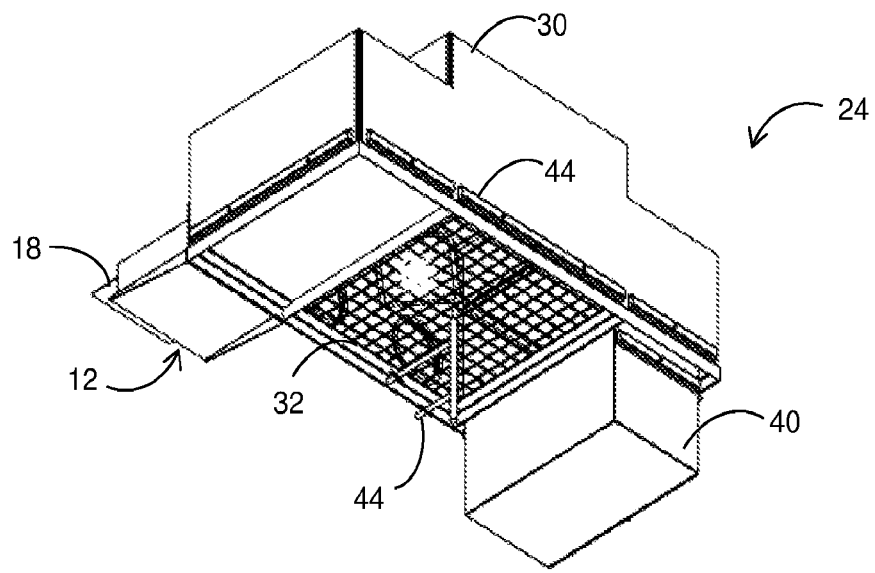
FIG. 7B is a bottom perspective view of the glove box of FIG. 7A.
Figure 7C:
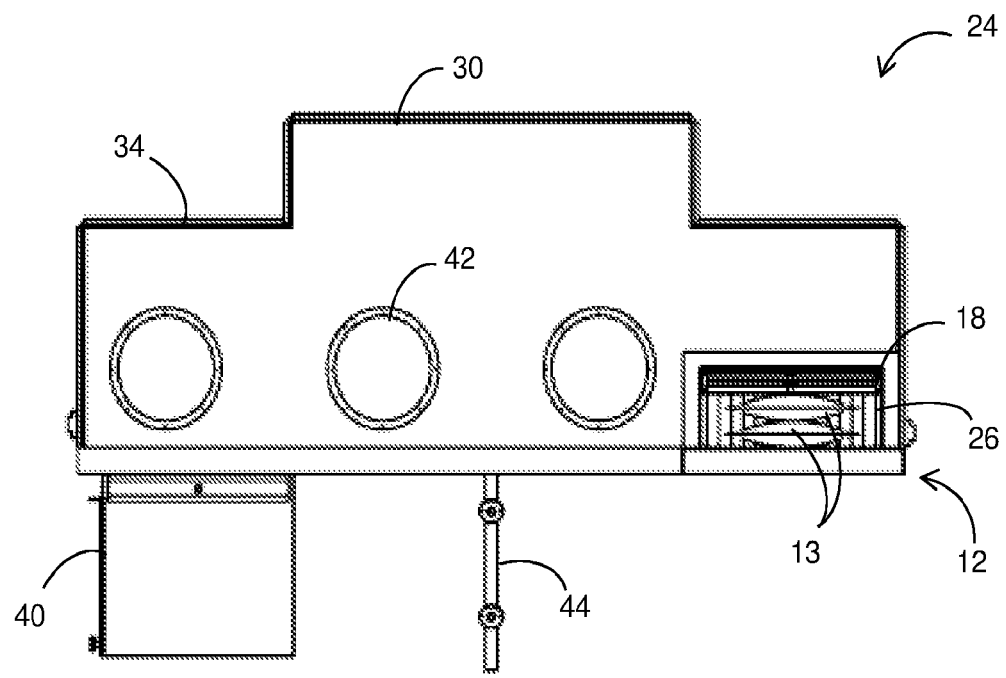
FIG. 7C is a rear view of the glove box of FIG. 7A.
Figure 7D:
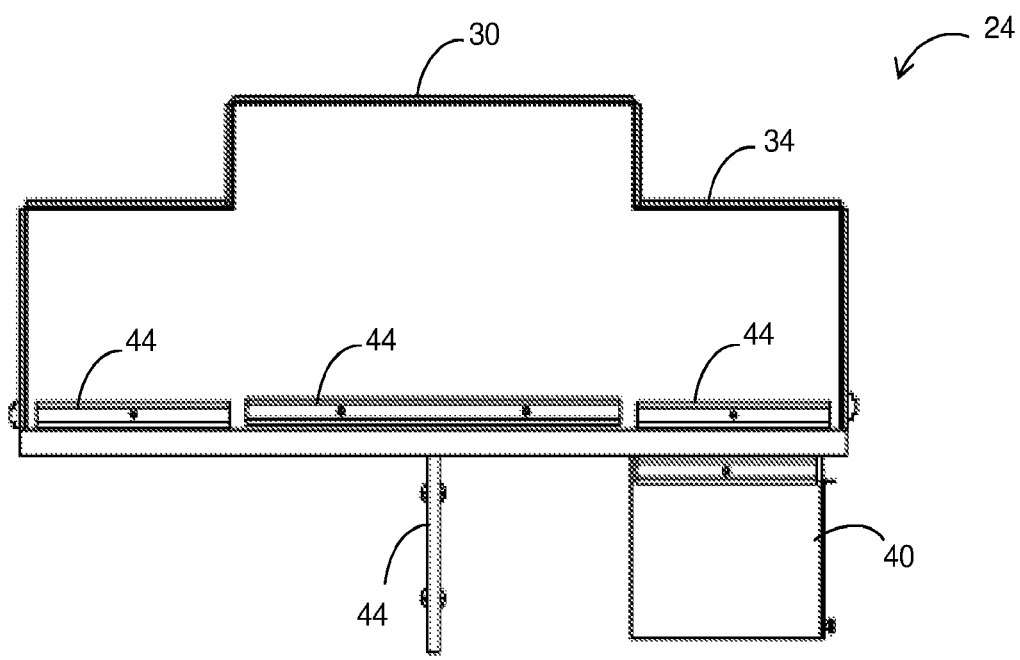
FIG. 7D is a front view of the glove box of FIG. 7A

Referring to FIG. 2, the transfer receptacle 12 can be connected with a through-opening 22 to a glove box 24. The through-opening 22 can be oppositely disposed from the opening 20 through which the product is introduced. Referring to FIG. 7C, one or more curtains 26 can be disposed over the through-opening 22. For example, the curtain 26 can be rubber curtains. The curtains 26 can be provided across the through-opening 22 to further aid in maintaining the aseptic environment of the system 10. As described above, the door 18 of the transfer receptacle 12 can be hinged such that the hinged end partially seals the through-opening 22 during loading the transfer receptacle 12 to limit exposure of the glove box 24 to the ambient conditions.

Referring to FIGS. 7A-7D, the transfer receptacle 12 can further include one or more gassing elements 28 for maintaining a flow of inert gas in the transfer receptacle to maintain low oxygen levels. The oxygen levels and selection of the inert gas in any of the gassing elements described herein can be selected based on the products being processed and the aseptic conditions needed. For example, in embodiments, the inert gas can be flowed throughout the system to maintain a level of oxygen in the product of less than 0.5%.

Figure 5:
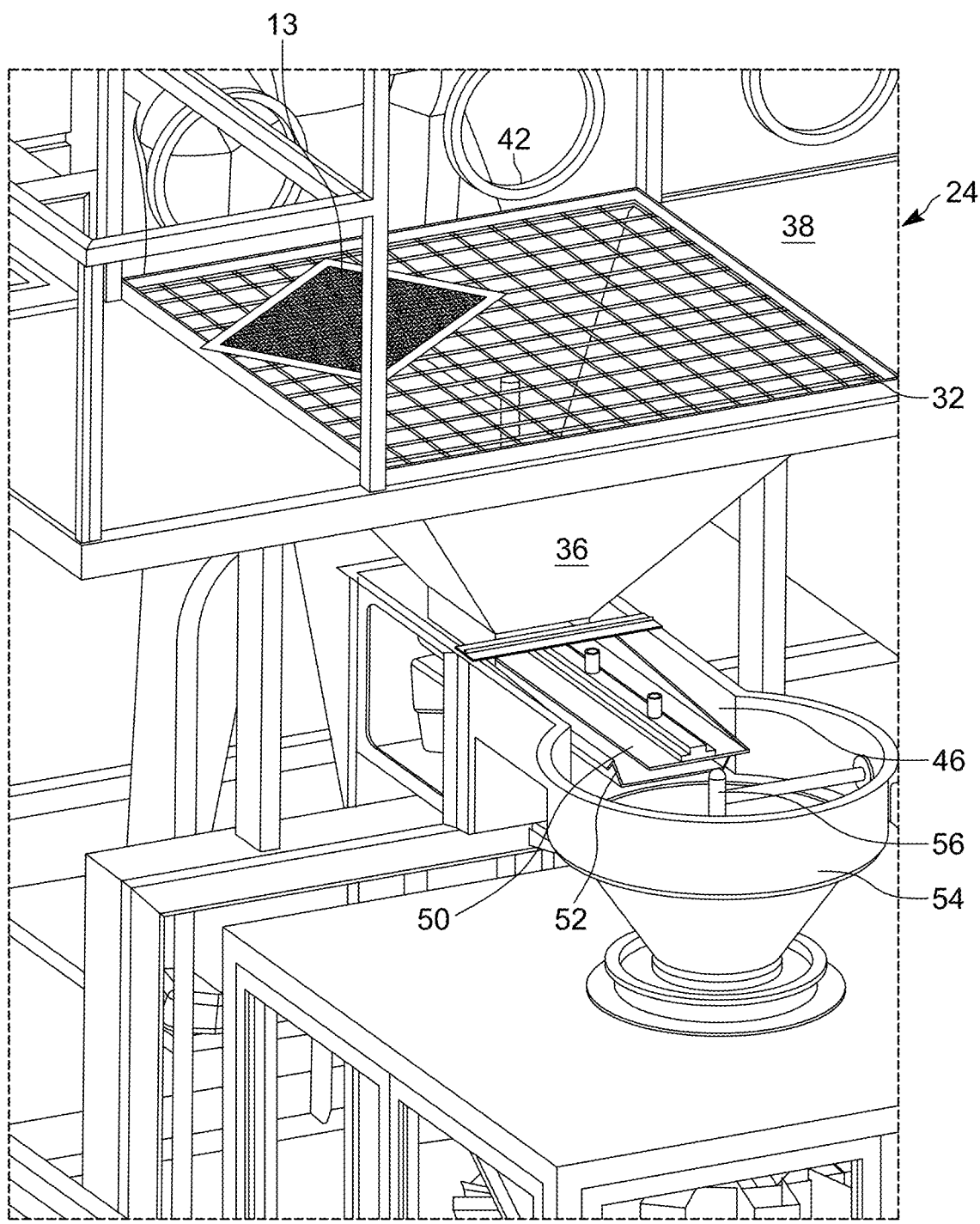
FIG. 5 is a schematic illustration of a portion of an aseptic filling system in accordance with embodiments of the disclosure.

Referring to FIG. 5, the glove box 24 can include a central region 30 through which the product 14 can flow through to a hopper 36. In embodiments, the glove box 24 can include a grate 32 having a plurality of openings in this central region 30. The plurality of openings can be sized to allow the product 14 to flow through but prevent the pouch 13 or other objects from passing through. In embodiments, for example, in which the product 14 is provided as free product and not in a pouch 13, the central region 30 can include an opening without the grate 32.

Referring to FIG. 4, the glove box 24 can further include a disposal region 34 adjacent to the central region 30. The disposal region 34 can be particularly advantageous when processing products provided in a pouch 13. The pouch 13 can be opened when it is disposed within the glove box 24, and product 14 can be emptied into the hopper 36 through the central region 30. The pouch 13 can then be moved to the disposal region 34. The disposal region 34 can include a door 38 through which the pouch 13 can be passed to a trash receptacle 40. The door 38 can seal the trash receptacle 40 from the interior volume of the glove box 24, such that when the door 38 is closed, the trash receptacle 40 can be emptied through another door 39 without exposing the glove box 24 to ambient conditions.

Referring to FIG. 5, the glove box 24 can include one or more gloved opening 42 for accessing various regions of the interior of the glove box 24. The gloved openings can be as conventionally known in the art. The figures show the gloved openings 42 without the gloves therein so the internal portion of the glove box can be more easily seen.

Referring again to FIG. 7B, the glove box 24 can include one or more gassing elements 44 to maintain a flow of inert gas throughout the glove box 24. One or more of these gassing elements 44 can be arranged to direct the flow of inert gas over the product as it is passed through to the hopper 36.

Figure 16A:
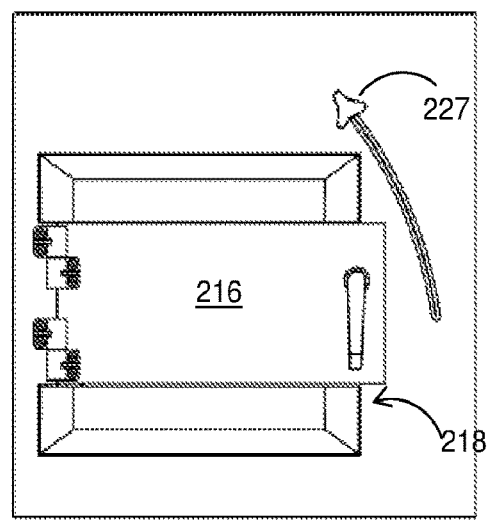
FIG. 16A is a top view of a door for a bulk packaging system having a pouch opening apparatus in accordance with embodiments of the disclosure.
Figure 16B:
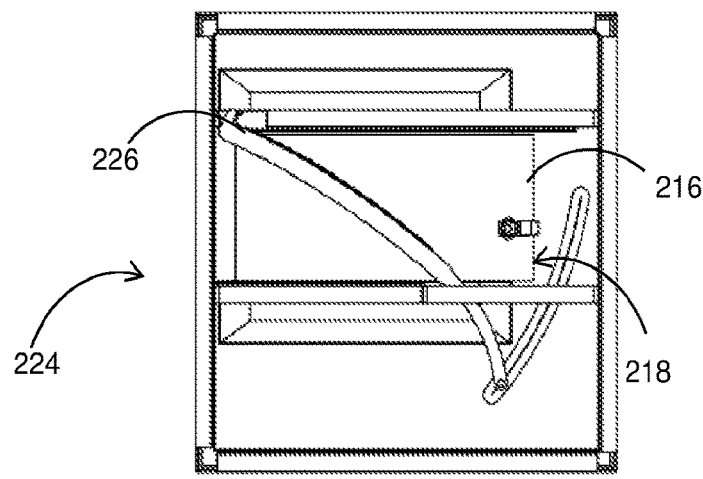
FIG. 16B is a bottom view of the door of FIG. 16A.
Figure 16C:
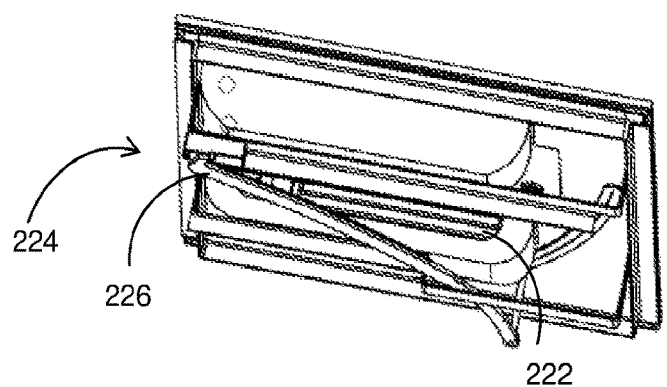
FIG. 16C is a bottom perspective view of the door of FIG. 16A.

In embodiments, the transfer receptacle 12 can interface directly with the hopper 36 and the glove box 24 can be omitted. In still further embodiments, the transfer receptacle 12 and the glove box 24 can be omitted and a door structure, such as illustrated in FIGS. 16A-16C as described in detail below can be incorporated into the hopper 36 of the system for filling 10. As detailed below, the door structure can cover the hopper and can include a pouch opening apparatus that can cut open a pouch to release the product contained therein into the hopper. The door structure can include a door to seal the system from the external environment after the product is loaded into the system. In such embodiments, a gassing element can be provided just downstream of the door structure, within the hopper or within the door structure to flow inert gas across the opening of the hopper such that the pouch and the product is contacted with the flow of inert gas during loading. The hopper and/or the door structure can further include an exhaust oppositely disposed from the gassing element to collect the flow of inert gas after it contacts the pouch or the product as it is loaded. The exhaust can ensure that any particulate or spores that are swept off the product during loading are captured by the exhaust and removed so they cannot pass through the system with the product. In embodiments, the gassing element and exhaust are part of a gassing recirculation system. The gassing element can flow gas filtered from the gassing recirculation system and the exhaust can transport the collected gas to the filter of the recirculation system for filtration and reintroduction as clean gas through the system.

Figure 6:
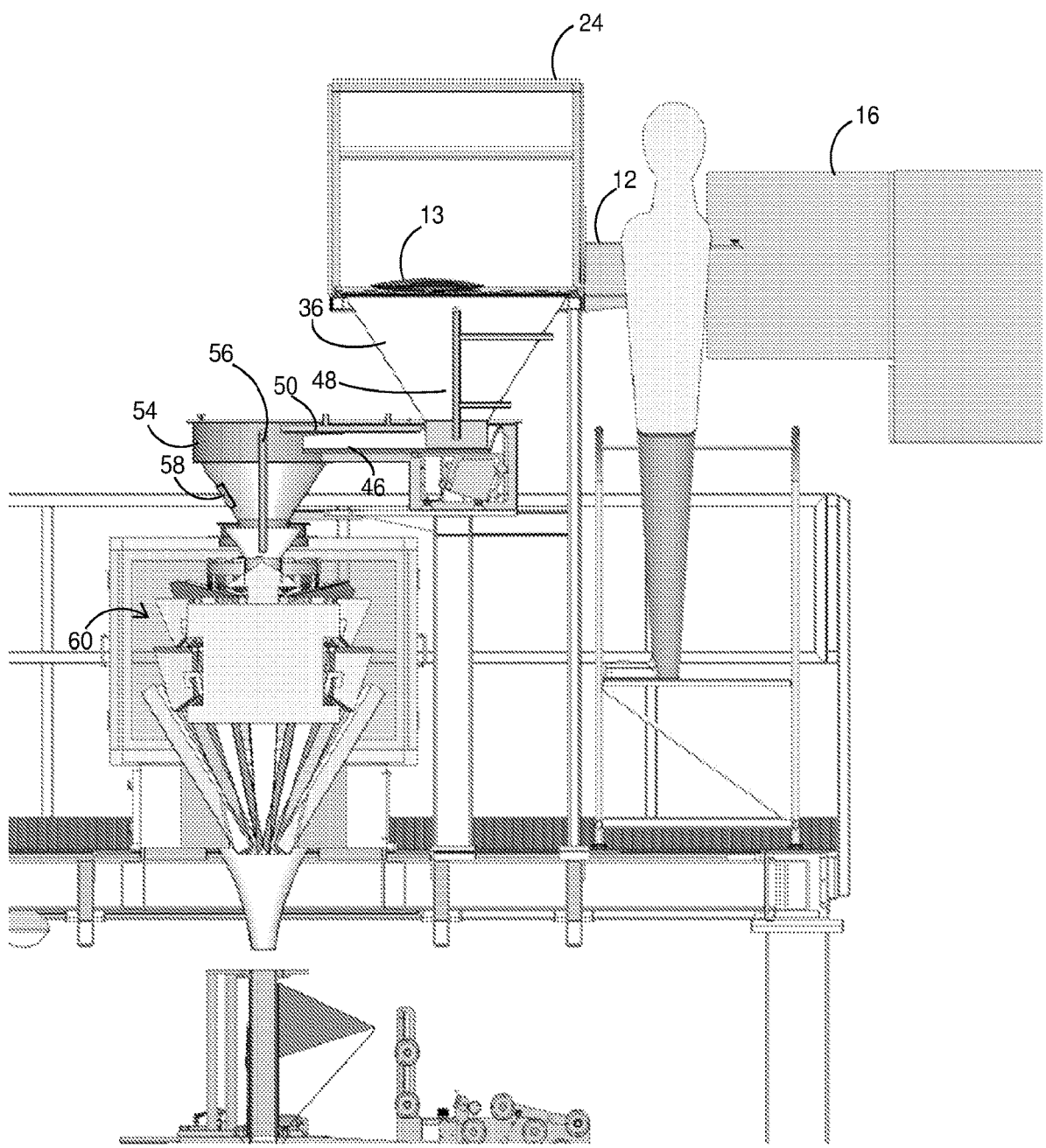
FIG. 6 is a side view of a filling system in accordance with embodiments of the disclosure.

Referring to FIG. 6, the product 14 passes through the hopper 36 to a feeder 46. The hopper 36 can include a vertically extending and centrally disposed gassing element 48 to maintain a laminar flow of inert gas within the hopper 36.

The hopper 36 can be sealed or provided in an enclosure to seal the hopper from ambient conditions.

The product 14 passes through the hopper 36 to a feeder 46. Vibrating and non-vibrating type feeders can be used. The feeder 46 includes gassing elements 50 for maintaining a flow of inert gas over the product 14 while is passes through the feeder 46. In embodiments, the gassing elements 50 are disposed above the product 14. In embodiments, the gassing elements 50 are disposed below the product 14. In still further embodiments, the gassing elements 50 are disposed both above and below the product 14. The feeder 46 can be sealed such that the flow path of the product through the feeder 46 is sealed from ambient conditions. In embodiments containing a vibrating feeder 46, the feeder 46 can include a tray 52 that defines the product path through the vibrating feeder 46. The tray 52 can be vibrated as is known in the art to control the flow of product through the feeder 46. The vibrating feeder 46 can include one or more gassing elements 50 disposed above and/or below the tray 52 to direct a flow of inert gas over and/or within the product 14 as it flows though the feeder 46. The feeder 46 feeds the product to a funnel 54.

The funnel 54 is in communication with the feeder 46 and the path of the product from the feeder 46 to the funnel 54 is sealed against ambient conditions. The funnel 54 can include a vertically extending and centrally disposed gassing element 56 to maintain a substantially radially flow or substantially radially directed flow of inert gas in the funnel 54. The funnel 54 can additionally or alternatively include one or more gassing elements 58 disposed on a sidewall of the funnel.

The funnel 54 transports product to a scale 60. The funnel 54 can be sealed to a receiving region of the scale 60 and/or a receiving portion of an enclosure for the scale 60. Any suitable scale 60 can be used and can be selected based on the product being handled.

In embodiments, the feeder, funnel and the scale can be surrounded by an enclosure. In such embodiments, a gas recirculation system can be provided to recirculate filtered, for example HEPA filtered gas or air, within the enclosure. In embodiments, the scale is surrounded by an enclosure, which can optionally include a gas recirculation system to recirculate filtered, for example HEPA filtered gas or air, within the enclosure.

Figure 8:
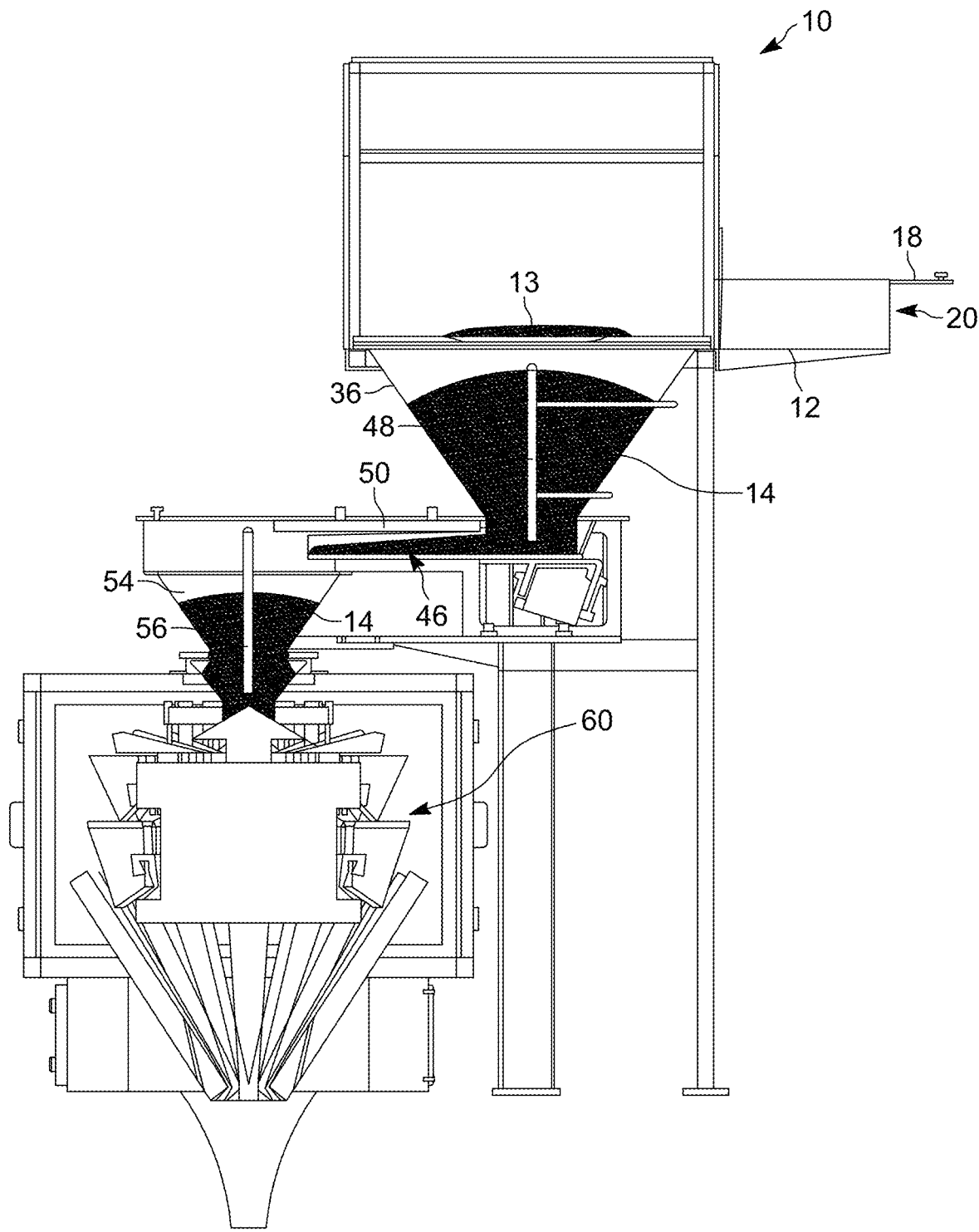
FIG. 8 is a cut-away view of a hopper and scale showing gassing elements for use in a system in accordance with the disclosure.

Referring to FIG. 8, throughout the system 10, the product is flowed through a product flow path. One or more gassing elements are arranged in the product flow path to maintain a flow of inert gas across the product flow path. In embodiments, the flow of inert gas can be selected to maintain an oxygen level of less than 0.5%. The product flow path can be sealed or substantially sealed to prevent exposure of the product to ambient conditions.

The system of aseptically filling product can interface with any suitable scale, which in turn can interface with any desired packaging machine. For example, the system 10 can interface with or include a combination scale 100 described herein. Further gassing elements and/or enclosures can be provided to aid in maintaining aseptic conditions through the transfer of the product to the packaging machine.

Combination Scale

Figure 10:
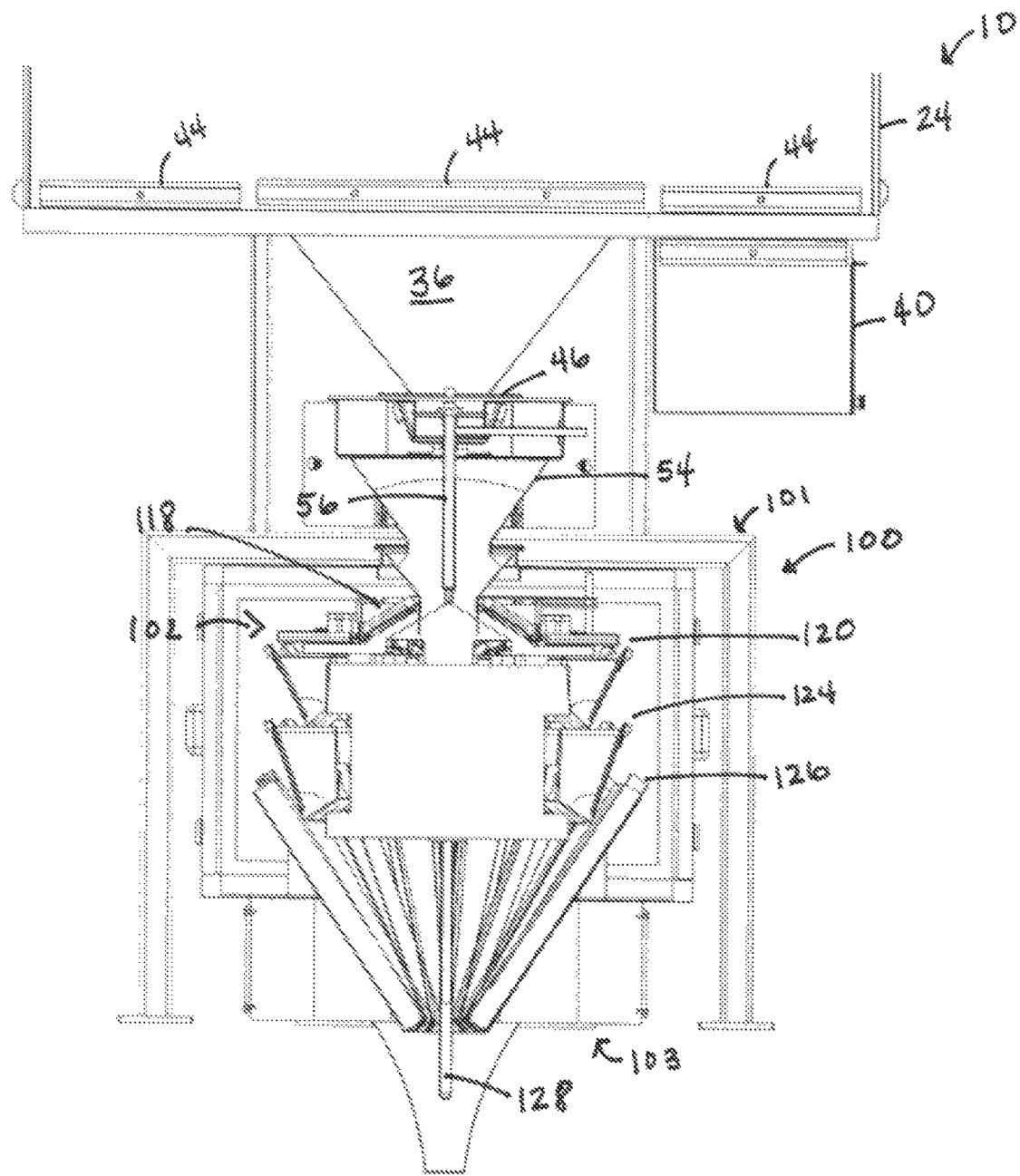
FIG. 10 is a cut away view of a scale having gassing elements in accordance with the disclosure.

Referring to FIG. 10, in embodiments, a gassing system 102 for a combination weigh scale 100 can be provided. The gassing system 102 for a combination weigh scale 100 and combination weigh scales 100 having the gassing system 102 can be incorporated into the systems for aseptic filling disclosed herein.

In embodiments, the scale 100 can be surrounded by an enclosure. In such embodiments, a recirculation system can be provided to recirculate filtered air or gas within the enclosure. In embodiments, the recirculation system can include a recirculation element at the first end 101 to flow filtered gas or air into the enclosure. The recirculation can further include an exhaust at the second end 103 to collect the air or gas from the system. The recirculation element and the exhaust are in fluid communication with a filter interposed there between such that the collected air or gas from the enclosure is filtered prior to recirculation into the enclosure by the recirculation element. The filter can be, for example, a HEPA filter. Any of the foregoing described features of the recirculation system can be implanted in the system used with the scale 100.

Figure 11:
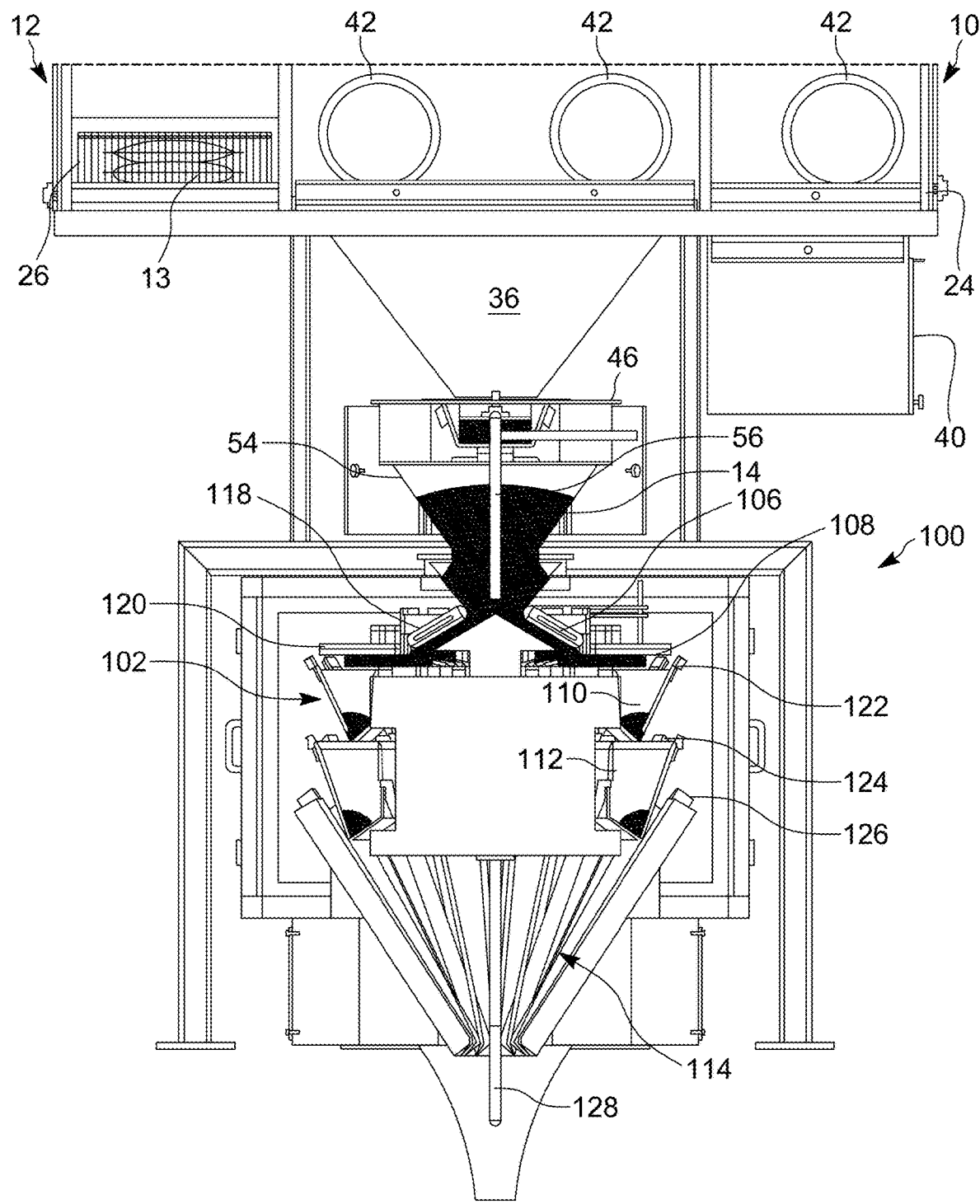
FIG. 11 is the scale of FIG. 10 showing product flowing through the scale.

Referring to FIGS. 10 and 11, combination weigh scales 100 generally include a scale funnel 104 that is arranged to receive product 14 from the funnel 54 of the system 10 to weighing and filling. The scale funnel 104 transfer product to a dispersion feeder 106 that disperse product 14 to one or more feeders 108, which directs the product to the feed hoppers 110. The feed hoppers 110 then transfer product 14 to one or more weigh buckets 112. The scale 100 then transfers product 14 from one or more of the weigh buckets 112 to a collating chute 114 depending on the total weight of the product 14 needed. The collating chute 114 then transfers product 14 to the filling input of the packaging machine. While embodiments shown in the drawings here are radial scales, linear scales are also contemplated herein and gassing systems having the features described herein can be arranged for use in linear scales.

Figure 12:
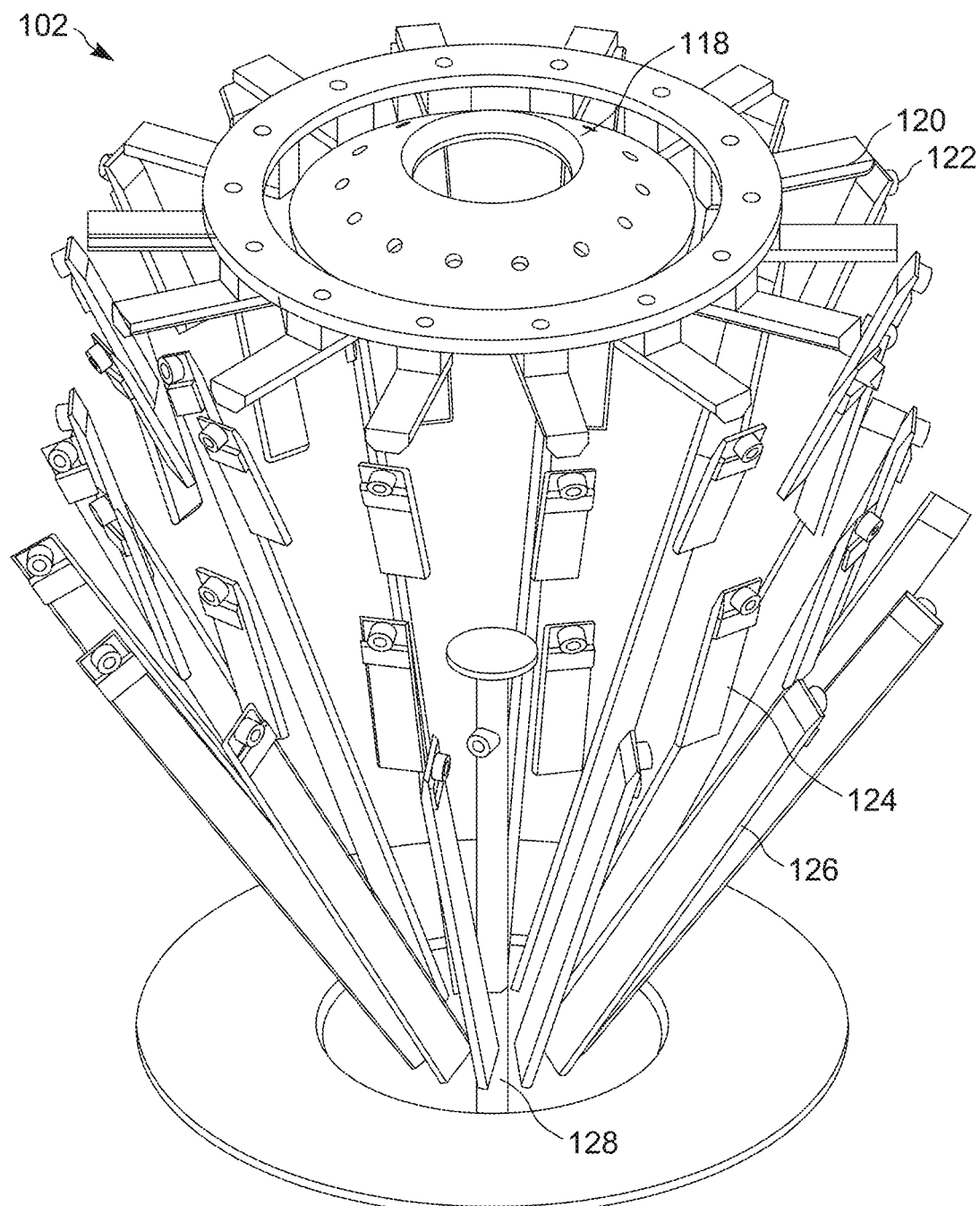
FIG. 12 is a schematic illustration showing a gassing system in accordance with embodiments of the disclosure.

Referring to FIG. 12, the gassing system 102 can include a dispersion feeder gassing element 118 disposed at a first end 101 of the scale. The dispersion feeder gassing element 118 can be frustoconically shape for example for a radial combination weigh scale. The dispersion feeder gassing element 118 is arranged to direct a flow of inert gas over the product 14 as it is dispersed from the dispersion feeder 106 to the feeders 108. In embodiments of a radial scale, the feeders 108 can be radial feeders. The scale 100 can include one or more outer feeder gassing elements 120 extending outward from the dispersion feeder gassing element 118 to direct a flow of inert gas over the product in the feeders 108. In embodiments, the feeders 108 can be radial feeders and the outer feeder gassing elements 120 can be outer radial feeder gassing elements that are arranged radially outward from the dispersion feeder 106.

The gassing system 102 can further include one or more feed hopper gassing elements 122 positioned downstream of the outer feeder gassing elements 120 and positioned to direct flow of gas to the one or more feed hoppers 110 that transfer product to one or more weight buckets 112.

The system can still further include one or more weigh bucket gassing elements 124 disposed downstream of the one or more feed hopper gassing elements 122 and positioned to direct flow of gas into the one or more weight buckets 112.

The gassing system 102 can also include one or more collating chute gassing elements 126 disposed downstream of the one or more weight bucket gassing elements 124 and positioned to radially direct flow of gas into a collating chute 114. A vertical collating chute gassing element 128, extending vertically upward from a second end 103 of the scale, opposite the first end 101 of the scale, and arranged to be disposed within and maintain flow of gas within the collating chute 114.

In embodiments, the vertical gassing element 36 disposed through the funnel 54 of the system for aseptic filling 10 can extend into the scale funnel 104 to provide a flow of inert gas within the scale funnel 104.

Bulk Packaging System

Figure 14A:
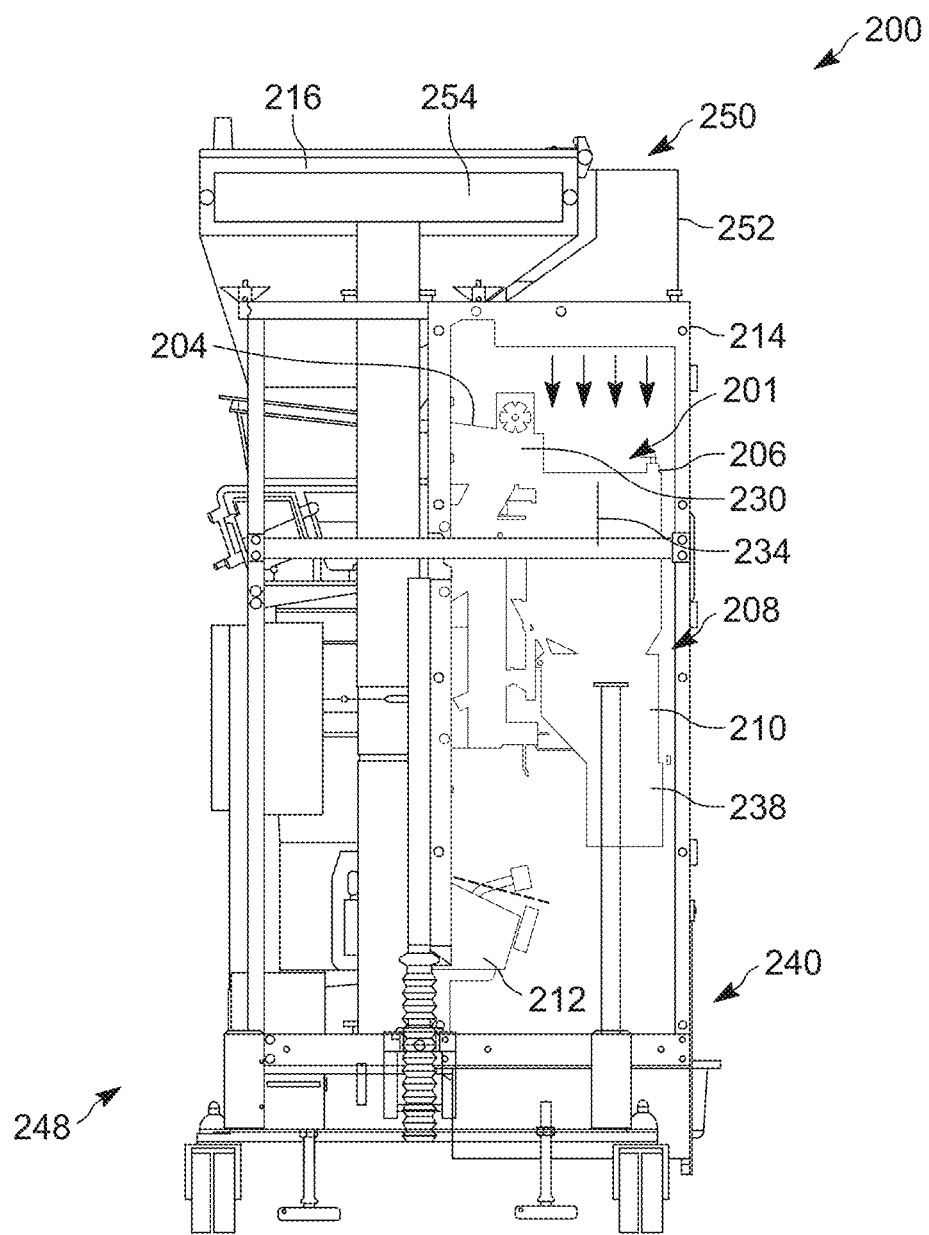
FIG. 14A is a side view of a bulk packaging system in accordance with embodiments of the disclosure, showing the components of the system through the enclosure and showing the system in a retracted position.
Figure 14B:
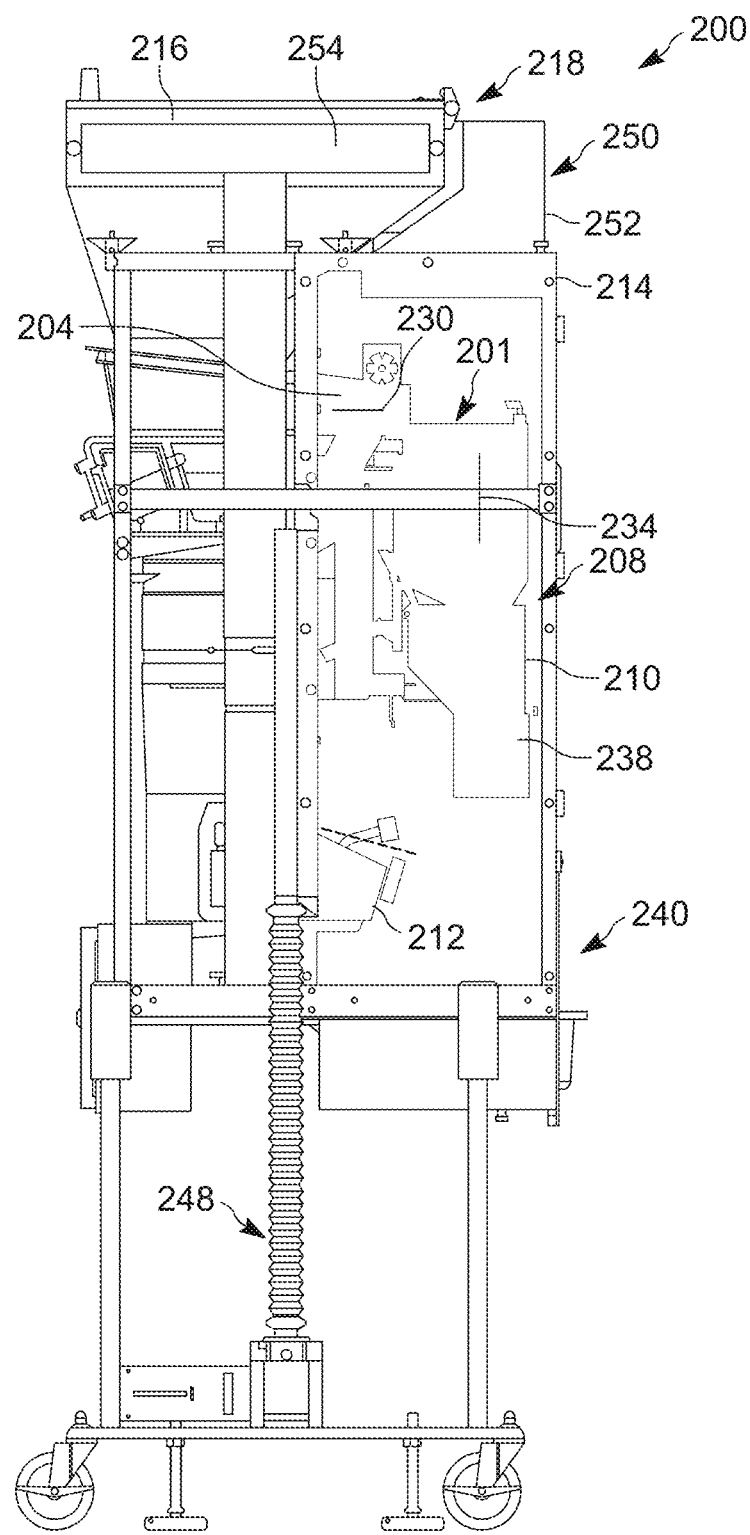
FIG. 14B is a side view of the bulk packaging system of FIG. 14A, showing the system in an extended position.

Referring to FIGS. 14A and 14B, in embodiments, the system is for bulk packaging 200 of the product 14. In embodiments, the bulk packaging system 200 includes a hopper 202 through which product 14 is introduced into the system 200. The hopper 202 is in fluid communication with a feeder 204 that transports the product 14 from the hopper 202 to a weigh hopper 206. The weigh hopper can include a lower portion 208 that interfaces with a filling station 210. The product 14 then transfers from the weigh hopper 206 for weighing and dispensing of a predetermined amount of product 14 to a filling station 210 for filling a bulk package with the product from the weigh hopper 206. The system 200 can also include a sealing station 212 for sealing the bulk package after it is filled. The system 200 can have an enclosure 214 surrounding a portion of the hopper 202, the feeder 204, weigh hopper 206, and filling and sealing stations 210, 212, to thereby protect the system 200 from the external environment and better maintain an aseptic environment within the components of the system 200 through the flow of the inert gas.

Figure 13A:
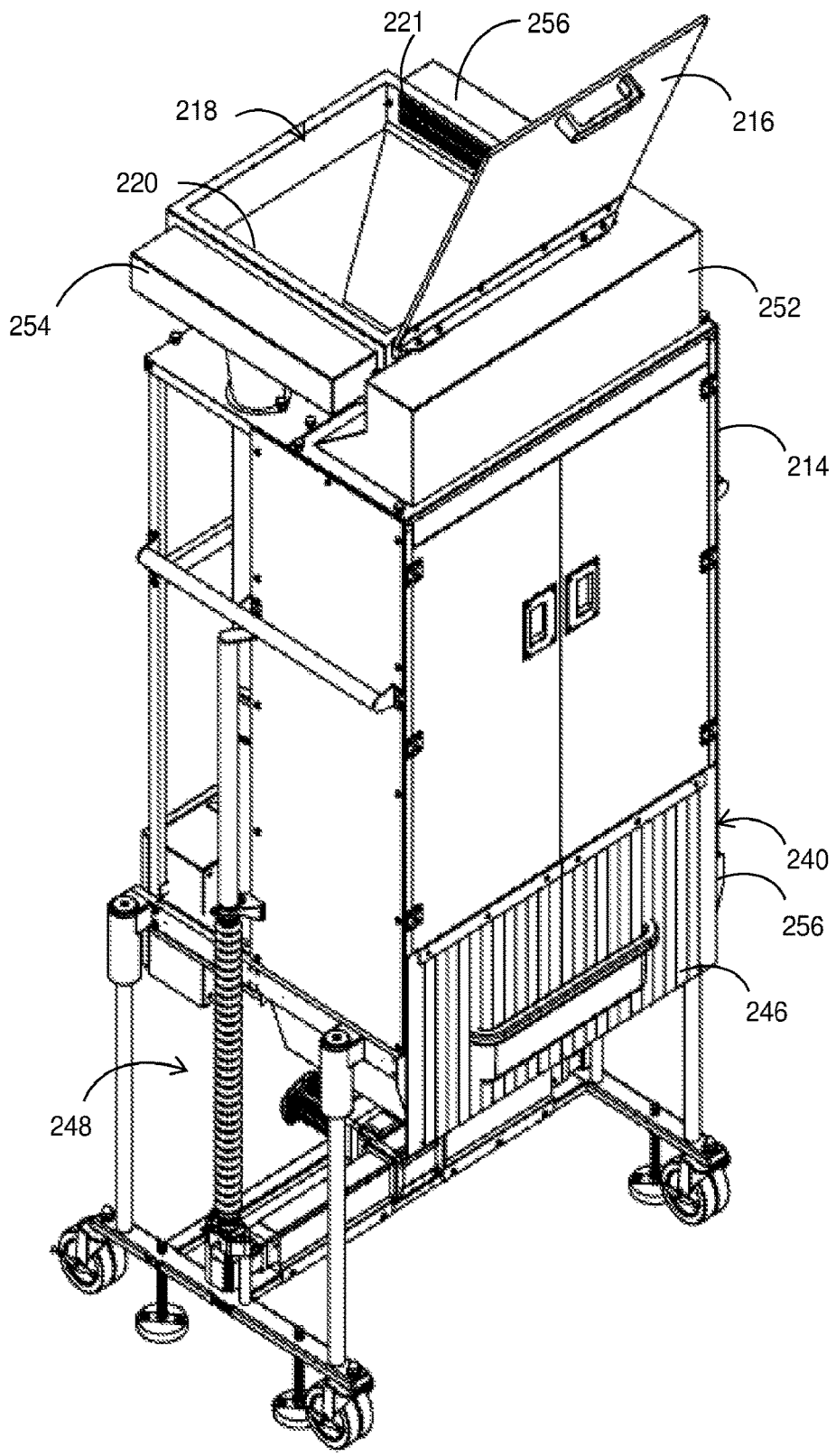
FIG. 13A is a perspective view of a bulk packaging system in accordance with embodiments of the disclosure, showing the door of the hopper in the open position.

Referring to FIG. 13A, the hopper 202 includes a product inlet 218 that is sealed by a door 216. The door 216 is opened to expose the product inlet 218 and allow product to be loaded into the hopper 202. In embodiments, the enclosure 214 seals around the hopper 202, with the door 216 sealing the top of the enclosure 214 and allowing access to the hopper 202. In other embodiments, the enclosure 214 seals round a lower portion of the hopper 202.

Figure 13B:
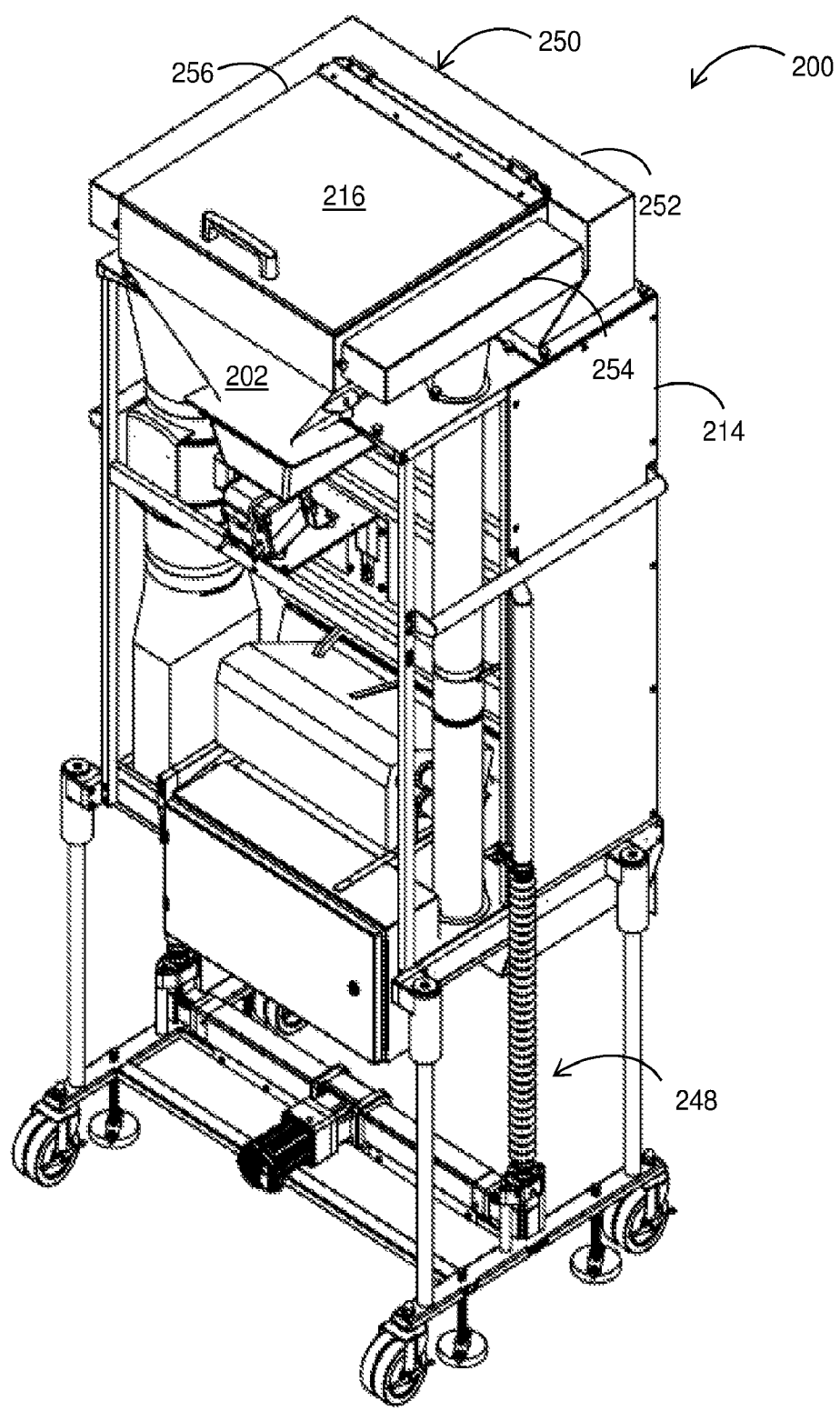
FIG. 13B is rear perspective view of the bulk packaging system of FIG. 13B, showing the door in the closed position.

Referring to FIG. 13B, after the product 14 is emptied into the hopper 202, the door 216 can close or be closed, sealing the system 200 from the external environment. In embodiments, a gassing element 220 is provide at the product inlet 218. The gassing element 220 can generate a flow of inert gas across the product inlet 218, such that the product 14 must travel through the flow of inert gas before flowing through the hopper 202. In embodiments, an exhaust 221 is provided oppositely disposed of the gassing element 220 to remove the flow of inert gas after is crosses the product inlet 218. In embodiments the gassing element 220 and the exhaust 221 are part of a gas recirculation system 250. The gas recirculation system can further include a recirculation filter 252.

Figure 15:
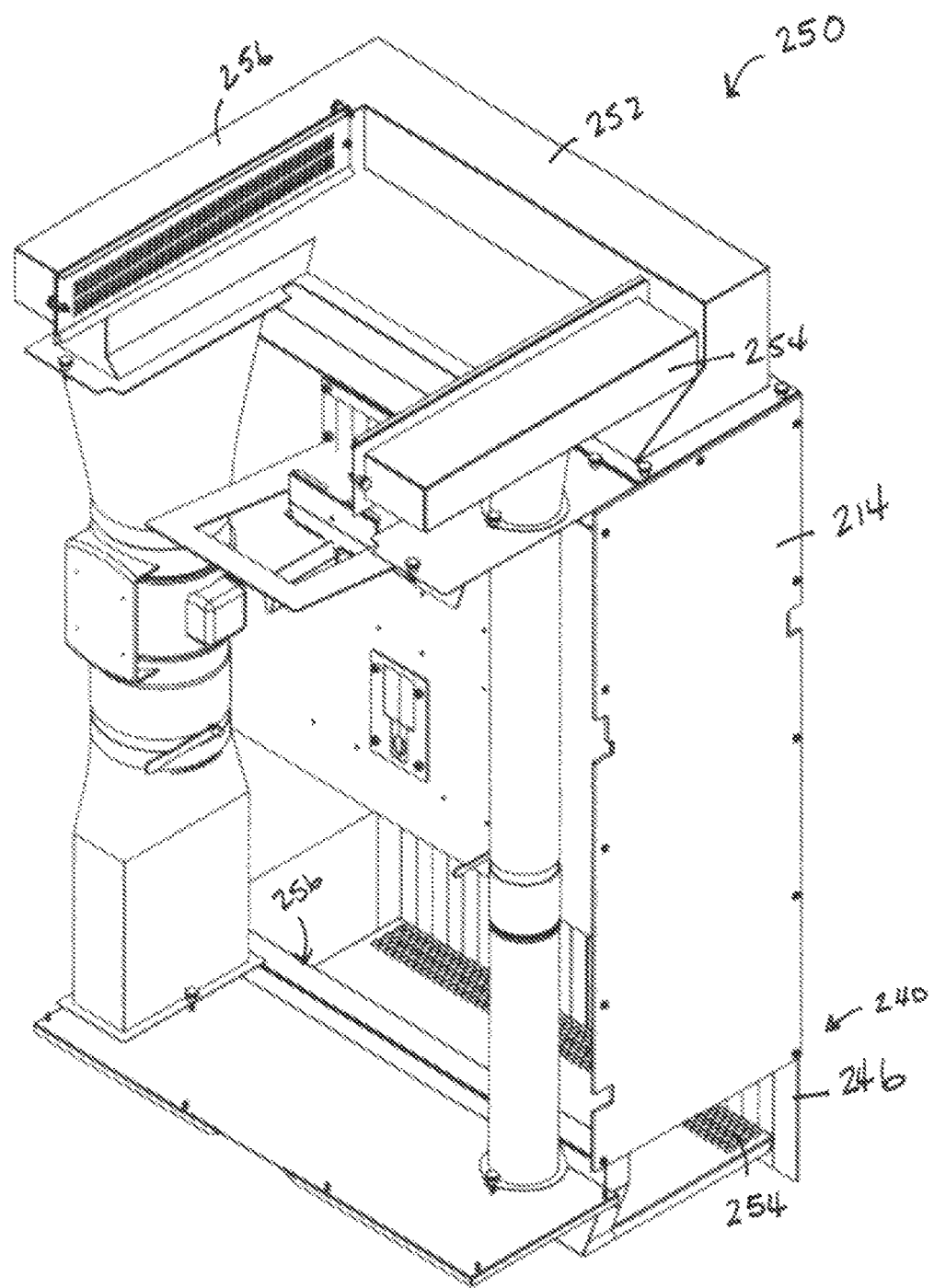
FIG. 15 is a rear perspective view of a gassing assembly of a bulk packaging system in accordance with embodiments of the disclosure.

Referring to FIG. 15, the recirculation system 250 can include the recirculation filter 252 disposed on the enclosure 214 and can include a recirculation element 254 for flowing gas from the filter into the enclosure 214. Referring to FIG. 14A, the recirculation element 254 can be positioned to flow filtered inert gas in the direction of the arrows shown in FIG. 13B, such that the flow of gas passes over the components of the system 200. The recirculation system 250 can include a further exhaust 256 at a bottom or downstream portion of the enclosure to collect the flow of gas. The exhausts 224 and 256 are in fluid communication with the recirculation filter 252, passing the collected flow of gas to the filter for filtration and then reintroduction to the system 200 by the gassing element 220 and the recirculation element 254. In embodiments, the recirculation system 250 can further include additional recirculation exhausts (not show), which can collect the flow of gas at different points within the enclosure 214, downstream of the recirculation element 254. This can beneficially remove potential contaminants that are flowed into the flow of gas from the recirculation system 250 by gassing elements within the components of the systems (described in detail below). Any suitable number of exhausts can be included along the product flow path of the system within the enclosure 214.

In embodiments, a UV radiation source 222 can be provided within or adjacent to the hopper 202 to expose the product inlet 218 to and the product 14 being entered there through to UV radiation upon entry into the hopper 202. For example, referring to FIG. 16C, a UV radiation source can be included in a frame structure that resides over the hopper 202 to seal the product inlet 218. The frame structure can include the door 216 and the pouch opening apparatus 224 as described in detail below.

In embodiments, the product 14 is provided into the hopper 202 from a sterilized pouch 13. In embodiments, a pouch opening apparatus 224 can be disposed at or just downstream or upstream of the product inlet 218. For example, referring to FIGS. 16A-16C, the pouch opening apparatus 224 can be disposed within a frame structure sealing over the hopper and including the door 216, such that when the door is opened 216, the pouch opening apparatus 224 is exposed and the pouch can be partially inserted into the product inlet for opening by the pouch opening apparatus 224. In such embodiments, the gassing element 220 can flow the inert gas across the pouch opening apparatus 224. The pouch opening apparatus 224 can cut an opening in the pouch to allow the product 14 to be flowed out of the pouch 13 and into the hopper 202. Referring to FIGS. 16B and 16C, in embodiments, the product opening apparatus 224 can include a blade 226 that actuates to cut the pouch a portion of the way open, leaving the cut portion attached to the pouch so that product can flow through the opening into the hopper 202, while the cut portion remains attached to the pouch and can be withdrawn from through the door 216 with the pouch 13 for disposal. In embodiments, as shown in FIG. 16B, the blade 226 can actuate on an arced path. In embodiments, a knob or handle 227 connected to the blade 226 can be disposed adjacent the door 216 such that the user can open the door 216 and use the knob or handle 227 to actuate the blade 226 while holding the pouch 13 in the path of the blade 226.

In other embodiments, the product 14 is received directly from a sterilizer unit (not shown). In such embodiments, the door 216 can be coordinated with the sterilizer unit to allow for opening of the door 216 when the sterilizer unit completes the sterilization cycle and is ready to dispense the sterilized product. In other embodiments, the sterilizer unit can be integrally formed with the system 200 such that the door 216 serves as both the seal of the sterilizer unit and the access to the hopper 202 to release the sterilized product 14 therein. Any suitable configuration for gaining access to the product inlet 218 during loading of the product 14 into the system 200, while allowing the system 200 to be sealed thereafter can be used.

Referring to FIG. 14A, the hopper 202 can include one or more gassing elements 228 disposed downstream of the product inlet 218 to maintain a flow of inert gas over and/or through the product 14 while it flows through the hopper 202. Any of the gassing element arrangements described herein can be used in the hopper. For example, the hopper can include a vertical gassing element 228 that extends from the product inlet to the product outlet to emit a radial flow of inert gas within the hopper 202.

The feeder 204 is disposed downstream of the hopper 202 and receive the product 14 from the hopper 202. Vibrating and non-vibrating type feeders can be used. The feeder 204 includes one or more gassing elements 230 for maintaining a flow of inert gas over and/or through the product 14 while is passes through the feeder 204. In embodiments, the gassing elements 230 are disposed above the product. In embodiments, the gassing elements 230 are disposed below the product. In still further embodiments, the gassing elements 230 extend through the flow path of the product to flow the inert gas through the product. In still further embodiments, the gassing elements 230 are disposed both above and below the product. In embodiments, the gassing elements 230 can be disposed above and/or below the product and in the product flow path. In embodiments, the feeder 204 can be sealed such that the flow path of the product 14 through the feeder 204 is sealed to maintain better residence of the inert gas within the flow path. In other embodiments, the feeder 204 is not sealed, but remains protected from the external environment by the enclosure 214 of the system 200.

In embodiments containing a vibrating feeder 204, the feeder 204 can include a tray 232 that defines the product path through the vibrating feeder 204. The tray 232 can be vibrated as is known in the art to control the flow of product 14 through the feeder 204. The vibrating feeder 204 can include one or more gassing elements 230 disposed above and/or below the tray 232 to direct a flow of inert gas over the product 14 as it flows though the feeder 204. The feeder 204 feeds the product to a weigh hopper.

The weigh hopper 206 can be as described above and include one or more gassing elements 234 for maintaining a flow of inert gas throughout the weigh hopper 206.

The filling station 210 can include a package receiving area 238 where an empty package can be positioned to be filled with the product 14. In embodiments, the enclosure 214 can include an access panel 240 arranged in the region of the filling station 210 to allow a user to reach into the enclosure 214 and hold an empty package at the filling station 210 to be filled with a measured amount of product 14 from the scale 208. The sealing station 212 can be arranged just downstream of the filling station 210 such that the user can shift the filled package quickly to the sealing station 212 for sealing the filled package before removing it through the access panel 240.

The enclosure 214 can include one or more gassing elements that flow inert gas across the access panel 240. An exhaust can be provided in the immediate vicinity of the flow across the access panel 240 to remove the inert gas after it is flowed across the access panel 240. This can advantageously remove any potential contaminants that may be swept up by the flow of inert gas from the system. For example, such contaminants may enter when a user reaches into the enclosure 214 through the access panel 240. In embodiments, the one or more gassing elements and the exhaust positioned at the access panel can be a part of the gas recirculation system 250. In embodiments, exhaust at the access panel region can be the main exhaust 254 of the gas recirculation system 250 that collects gas flowed throughout the enclosure and recirculates the gas to the recirculation filter 252.

The enclosure 214 can include a curtain 246 that covers the access panel 240 to provide some barrier against the external environment entering into the system. The curtain 246 can be, for example, strips that hang together to block the access panel 240, but which can be parted with applied pressure as the user reaches into the enclosure 214. Such curtains 246, which can be for example, vinyl, PVC, and other materials, are known in the art. For example, the curtains 246 can be made of a clear flexible PVC material.

In other embodiments, the access panel 240 can be provided with gloved openings (not shown), akin to a glove box to maintain the enclosure sealed against the external environment during filling and sealing by the user. For example, gloved openings as shown in the glove box 24 of the system for weighing and filling 10 can be used at the access panel 240.

The sealing station 212 can include a gassing element that injects a gas into the package prior to sealing to provide a modified atmosphere package. Any known systems for introduction of gas into a package for modified atmosphere packaging can be used. Modified atmosphere packaging can be advantageous in the cannabis industry, for example, where it is desirable to maintain low oxygen levels in the packaging to prevent possible recontamination. In such embodiments, the gassing element can inject nitrogen into the packaging. Other gasses for generating a desired modified atmosphere are also contemplated herein. Any suitable modified atmosphere can be generated depending on the nature of the product to be packaged.

In embodiments, the filling and sealing can happened in an automated fashion, such that there is no need for an access panel 240 in the enclosure 214 for a user to reach into the enclosure 214. In such embodiments, the enclosure 214 can be provided with a packaged product removal door (not shown) that opens to release packaged product. Like the access panel 240 or the hopper door 216, the removal door can include gassing elements to flow gas across the opening such that the packaged product has to pass through the flow of gas upon exiting the removal door. Additionally or alternatively, a UV radiation source for exposing the packaged product to UV radiation can be provided at the removal door.

Referring to FIGS. 14A and 14B, the bulk filling system 10 can include a frame 248 that can be adapted to raise and lower the system 10. FIG. 14A illustrates the bulk filling system 10 in a retracted position. The retracted position can be useful for moving the bulk filling system 10 into positions. For example, the ability to position a bulk filling system 10 in accordance with embodiments of the disclosure can make it easier to transport the system into a facility, for example, a cannabis growing facility, for packaging of the product onsite. FIG. 14B illustrates the bulk packaging system in the extended position and ready for use.

A method of bulk packaging a product using the system of the disclosure can include loading the hopper with loose product. In embodiments, the hopper can be loaded through the door at the product inlet. In embodiments, the product can be loaded from a sterilized pouch. The sterilized pouch can be opened by actuating a placed disposed within the product inlet to cut a portion of the sterilized pouch open, leaving the cut portion attached to the pouch. The product can be removed from the pouch and loaded into the hopper and the pouch can be then be removed from the product inlet. The door is then sealed to seal the system from the external environment. During loading of the product, a gassing element at the product inlet flows an inert gas across the inlet such that the product passes through the flow of gas as it is deposited into the hopper. In embodiments, the product inlet can further include a UV radiation source that exposed the sterilized pouch to UV radiation as it is cut open to remove the product from within the pouch.

In other embodiments, the product can be directly received as loose product from a sterilizer and deposited into the hopper.

Once in the hopper, a substantially constant flow of inert gas is maintained over the product by one or more gassing elements disposed in the hopper. The product flows through the hopper and into a feeder. In the feeder, gassing elements of the feeder maintain a flow of inert gas over and/or beneath the product flow path. The feeder transports the product to a funnel, which has one or more gassing elements for continued maintenance of the flow of inert gas over the product. For example, a centrally disposed gassing element can maintain a radial flow of inert gas within the funnel as the product flows through the funnel. The funnel transports the product to a scale for weighing and dispensing of a preset amount of product to a filling station.

The filling station fills a package with the preset amount of product. In embodiments, the filling station is operated by a user holding a package up to a loading funnel of the filling station, which then dispenses the present amount of product into the package. The user can access the filling station through an access panel in the enclosure. A flow of inert gas can be maintained over the access panel. The packages to be filled can be provided in a stack, for example, within the enclosure so that the user can reach in and access packages within the enclosure. In embodiments having a gloved access panel, the user can access the filling station using the gloves, with the packages being provided in reach of the gloves so a package can be grasped and held to the filling station.

After filling the user can shift the package to a sealing station, inserting the open portion of the filled package into the sealing station for sealing. In embodiments, such as shown in FIG. 14A, the sealing station is disposed beneath the filling station to allow for easy and quick shifting of the package from the filling station after filling to the sealing station. After sealing, the product can be removed from the enclosure 214 either through the access panel 240 or a product removal door.

Embodiments of the disclosure are depicted in the figures attached hereto. Such embodiments are provided by way of example only.

Aspects

In accordance with aspects of the disclosure, a system for aseptic processing of a product can include one or more components for transporting the product through the system, the components comprising a hopper through which the product can be loaded into the system and one or more of a feeder, a weigh hopper, a funnel, a scale, and a filling station; an enclosure surrounding at least a portion of the one or more components; a gassing assembly comprising at least one gassing element disposed within one or more of the components to flow inert gas over and/or through the product within the one or more components; a recirculation system comprising at least one recirculation element and at least one recirculation exhaust disposed downstream of the recirculation element, and a recirculation filter interposed between and in fluid communication with the at least one recirculation element and the at least one recirculation exhaust, wherein the recirculation system is configured to flow a filtered gas into the enclosure through the at least one recirculation element such that the filtered gas flows over the one or more components within the enclosure and is collected by the at least one recirculation exhaust, wherein the recirculation exhaust directs the collected gas to the filter, which filters the collected gas and directs the filtered gas to the at least one recirculation element for reintroduction into the enclosure.

In the system of this aspect, the one or more components further comprises a filling station for filling a package with the product.

In accordance with an aspect of the disclosure, a system for bulk filling of a package with a product can include components for transporting the product through the system. The components comprising a hopper through which the product can be loaded into the system; one or both of a feeder and weigh hopper through which the product can flow from the hopper to a filling station; the filling station having a package receiving area for positioning of an empty package to be filled with the product; and a sealing station for sealing the filled package. The system can include an enclosure surrounding one or more of the components; a gassing assembly comprising at least one gassing element disposed within one or more of the components to flow inert gas over the product within the one or more components; and a recirculation system. The recirculation system can include at least one recirculation element and at least one recirculation exhaust disposed downstream of the recirculation element, and a recirculation filter interposed between and in fluid communication with the at least one recirculation element and the at least one recirculation exhaust, wherein the recirculation system is configured to flow a filtered gas into the enclosure through the at least one recirculation element such that the filtered gas flows over the one or more components within the enclosure and is collected by the at least one recirculation exhaust, wherein the recirculation exhaust directs the collected gas to the recirculation filter, which filters the collected gas and directs the filtered gas to the at least one recirculation element for reintroduction into the enclosure.

In the system of any of the foregoing aspects, the enclosure can surround at least a portion of the hopper, the one or more of the feeder, the weigh hopper, the filling station, and the sealing station.

In the system of any of the foregoing aspects, the recirculation filter is a HEPA filter.

In the system of any of the foregoing aspects, the hopper comprising a product inlet opening through which the product is loaded, the recirculation system further comprises a recirculation element disposed at a product inlet opening to generate a flow of inert gas from the recirculation system across the product inlet opening, and a recirculation exhaust arranged to collect the flow of inert gas from the recirculation element disposed at the product inlet opening, wherein the recirculation element and recirculation exhaust at the product inlet opening are in fluid communication with the filter such that the recirculation exhaust at the product inlet open directs the collected gas through the filter, which filters the collected gas and directs it to the recirculation element at the product inlet opening and the at least one recirculation element for directing the filtered gas into the enclosure.

In the system of any of the foregoing aspects, the recirculation system is configured to filter and flow the air contained within the enclosure through the recirculation element.

In accordance with an aspect of the disclosure, a system for bulk filling a package with a product can include a hopper a feeder, a weigh hopper, a filling station, and a sealing station. The hopper can include product inlet and an oppositely disposed product outlet, a door movable between an open position in which the product inlet is exposed for receiving product and a close position in which the door seals over the product inlet, and a gassing element disposed at the product inlet and configured to flow an inert gas across the product inlet. The feeder can be positioned to receive the product from the hopper and transfer the product to a weigh hopper, the feeder comprising a gassing element extending through the feed to maintain a substantially constant flow of inert gas within the feeder. The weigh hopper can be positioned to receive the product from the feeder and transfer a measured quantity of the product to a filling station, a gassing element disposed within the weight hopper to maintain a laminar flow of gas within the weigh hopper. The filling station can be in fluid communication with the weigh hopper and arranged to receive the measured quantity of the product from the weigh hopper and transfer the product to a package. The sealing station can be downstream of the filling station for sealing the package after being filled with the product, the sealing station comprising a gassing element to inject an inert gas into the package prior to sealing. The system further includes an enclosure surrounding at least a portion of the hopper, the feeder, the weigh hopper, the filling station, and a sealing station, wherein the enclosure comprises an access panel arranged for allowing access to the filling and sealing stations to allow a user to position a package at the filling station for filling with the product and transition the filled package to the sealing station for sealing prior to withdraw from the enclosure. The system also includes a gassing assembly for flowing inert gas to each of the gassing elements from one or more gas inlets disposed in the hopper and/or the enclosure.

The system of the previous aspect can further include a recirculation system comprising at least one recirculation element and at least one recirculation exhaust disposed downstream of the recirculation element, and a recirculation filter interposed between and in fluid communication with the at least one recirculation element and the at least one recirculation exhaust, wherein the recirculation system is configured to flow a filtered gas into the enclosure through the at least one recirculation element such that the filtered gas flows over the one or more components within the enclosure and is collected by the at least one recirculation exhaust, wherein the recirculation exhaust directs the collected gas to the recirculation filter, which filters the collected gas and directs the filtered gas to the at least one recirculation element for reintroduction into the enclosure.

In the system of previous aspect, the gassing element disposed at the product inlet and configured to flow an inert gas across the product inlet is part of the recirculation system, the gassing element is in fluid communication with the recirculation filter of the recirculation system, and the recirculation system further comprises an exhaust disposed at the product inlet to collect the flow of inert gas from the gassing element disposed at the product inlet and direct the collected gas to the filter for filtration and recirculation to the gassing element and the at least one recirculation element.

In the system of the previous aspect, the at least one recirculation elements comprises a recirculation element disposed in a vicinity of the access panel to flow the filtered gas across the access panel, and the at least one recirculation exhaust comprises a recirculation exhaust disposed in the vicinity of the access panel to collected the flow of filtered gas.

In the system of the previous aspect, the recirculation system comprises a plurality of recirculation elements, at least one recirculation element being disposed at the top of the enclosure to direct flow downstream through the enclosure, at least one recirculation element being the gassing element disposed at the product inlet, and at least one recirculation element being disposed to flow filtered gas across the access panel, and at least two recirculation exhaust, at least one recirculation exhaust being disposed at the product inlet to collect the flow of inert gas from the gassing element disposed at the product inlet, and at least one recirculation exhaust disposed downstream of the at least one recirculation element at the top of the enclosure and arranged to collect filtered gas flowed through the enclosure from the at least one recirculation element at the top of the enclosure and the at least one recirculation element disposed to flow filtered gas across the access panel.

The system of any of the foregoing aspects can include a pouch opening apparatus for opening a pouch of product and releasing product contained within the pouch into the hopper, wherein the pouch opening apparatus is disposed within or adjacent to the hopper. The pouch opening apparatus can include an actuating blade configured to actuate to cut a portion of the pouch, opening the pouch to release the product into the hopper and leaving the cut portion attached to the pouch.

In the system of any of the foregoing aspects, the hopper or a structure sealing over the hopper such as the door structure can further comprises a UV radiation source arranged to expose the product and/or a pouch of product present from which the product is released into the hopper to UV radiation at the product inlet.

In the system of any of the forgoing aspects, the gassing element disposed at the product inlet flows inert gas laterally across the product inlet such that product must cross the flow of inert gas prior to entry into the hopper.

In the system of any of the forgoing aspects, the hopper further comprises a vertically mounted gassing element extending from the product inlet to the product outlet.

In the system of any of the forgoing aspects, the feeder is a vibrating feeder.

In the system of any of the forgoing aspects, the one or more gassing elements disposed in the feeder are disposed one or more of (i) above the product, (ii) below the product, and (iii) in a flow path of the product through the feeder.

In the system of any of the forgoing aspects, the access panel comprises a curtain through which access to within the enclosure can be made. The system can further include a gassing element for flowing inert gas across the curtain. The system can further include at least one exhaust is disposed in the vicinity of the access panel and to collect the filtered gas flowed through the enclosure.

In the system of any of the forgoing aspects, the enclosure is sealed around the hopper.

The system of any of the foregoing aspects can further include legs upon which the enclosure is disposed, wherein the enclosure is moveable between a first position in which the enclosure is disposed adjacent the legs and a second position in which the enclosure is shifted away from the legs.

In the system of any of the foregoing aspects, the gassing assembly comprises a filter disposed prior to the one or more gas inlets. The filter can be a HEPA filter.

In the system of any of the foregoing aspects, the gassing assembly controls the flow of gas to the one or more gassing elements, and comprises an inert gas input, a sterilization fluid input, a HEPA filter downstream of the inert gas input and the sterilization gas input, and a gas rail downstream of the HEPA filter to distribute the gas to the one or more gassing elements.

In accordance with aspects of the disclosure a system for aseptic filling of a package with a product can include a transfer receptacle having interior volume for receiving a sterilized product from a sterilization unit; and a glove box in communication with the interior volume of the transfer receptacle, such that the sterilized product can be transferred from the transfer receptacle and into the glove box, the glove box comprising an interior volume comprising a central region having an opening that provides communication to a hopper disposed downstream of the glove box. The hopper is positioned to receive the sterilized product from the glove box. A feeder is positioned to receive the sterilized product from the hopper and transfer the product to a funnel. The funnel is positioned to receive the product from the feeder and transfer the product to a scale. A plurality of gassing elements are positioned throughout the system to maintain a substantially constant flow of inert gas over and/or through the sterilized product as it flows through the system.

Any combination of the features described below with reference to the foregoing aspect can be combined as appropriate.

In the foregoing aspect, the central region of the glove box comprises a grate having a plurality of openings sized to allow only sterilized product to flow through to the hopper.

In the foregoing aspect, the sterilized product is received in the transfer receptacle as a pouch of sterilized product, and the plurality of openings are sized to prevent the pouch from passing through to the hopper.

In the foregoing aspect, the glove box further comprises a disposal region for receiving the pouch after the sterilized product has been removed.

In the foregoing aspect, the disposal region comprises a door which can be opened to allow removal of the pouch from the glove box to a sealed container in communication with the disposal region, the door adapted to seal against the sealed container to allow the sealed container to be opened for removal of a pouch therefrom without exposing the glove box to ambient conditions.

In the foregoing aspect, the plurality of gassing elements comprises one or more gassing elements disposed in the transfer receptacle, one or more gassing elements disposed in the glove box, one or more gassing elements disposed in the hopper, one or more gassing elements disposed in the feeder, and one or more gassing elements disposed in the funnel.

In the foregoing aspect, the one or more gassing elements disposed in the hopper comprises a vertically mounted gassing element.

In the foregoing aspect, the one or more gassing elements disposed in the funnel comprises a vertically mounted gassing element.

In the foregoing aspect, the one or more gassing elements disposed in the feeder are disposed one or more of (i) above the product, (ii) below the product, and (iii) in a flow path of the product through the feeder.

In the foregoing aspect, the one or more gassing elements disposed in the funnel and/or the hopper comprises gassing elements on one or more sides of the funnel and/or the hopper.

In the foregoing aspect, the scale is a combination scale and the combination scale comprises a plurality of gassing elements directed to maintain a flow of gas over and/or through the sterilized product while the sterilized product flows through the scale.

In the foregoing aspect, the transfer receptacle comprises a door that opens to receive the sterilized product and seals closed during transfer of the sterilized product to the glove box.

In accordance with an aspect of the disclosure, a system for aseptic filling of a package with a flowable product cam include a transfer receptacle that includes an interior volume for receiving a sterilized pouch of product, an opening for accessing the internal volume, a door adapted to shift between a first position in which the door seals the opening and a second position in which the door is disposed away from the opening allowing access to the internal volume, and one or more gassing elements for maintaining a flow of gas in the interior volume. The system can further include a glove box, the glove box being arranged such that the transfer receptacle is aligned with an opening in a wall of the glove box for receiving the sterilized pouch of product from the transfer receptacle. The glove box can include an interior volume having a central region disposed over a hopper, the central region comprising a plurality of openings sized to allow the product to flow through to the hopper, but prevent the pouch or portions thereof from entering the hopper, a disposal region comprising a door through which the pouch or portions thereof can be disposed to a trash receptacle, one or more gloved openings through which a user can access the interior volume, and one or more gassing elements for maintaining a flow of gas in the interior volume. The hopper can be disposed beneath the central region of the glove box for receiving product from the glove box, the hopper comprising a vertically mounted gas element for maintaining a flow of gas within the hopper. The system can further include a feeder fluidly coupling the hopper to a funnel, and having one or more gas rails disposed within the feeder above a region in which the product flows through the feeder, and one or more vibrating elements for vibrating the feeder at least in the region in which the product flows. The funnel and the vibrating feeder can be sealed, such that a path of the product through the feeder and into the funnel is sealed from ambient conditions, the funnel comprising a vertically mounted gas rail for maintaining radial flow of gas within the funnel. The scale can be sealed in a scale enclosure and fluidly coupled to the funnel to receive product for weighing and transferring to a forming tube of a packaging machine.

Any of the following features described with reference to the foregoing aspect can be combined as appropriate.

In the foregoing aspect, the vibrating feeder comprises a tray defining a flow path of the product, wherein the tray comprises one or more gassing elements.

In the foregoing aspect, the scale further comprises one or more gassing elements for maintaining a flow of gas within the scale.

In the foregoing aspect, the scale comprises one or more weigh buckets for receiving a measured amount of product, each of the one or more weight buckets comprising one or more gassing elements.

In the foregoing aspect, the system can further include a gas flow system or gassing assembly that controls the flow of gas to the one or more gassing elements, the gas flow system comprising an inert gas input, a sterilization fluid input, a HEPA filter downstream of the inert gas input and the sterilization gas input, and a gas rail downstream of the HEPA filter to distribute the gas to the one or more gassing elements.

In the foregoing aspect, the system is adapted to be substantially sealed to ambient conditions.

In the foregoing aspect, the funnel is sealed to the top of the scale enclosure.

In the foregoing aspect, the funnel comprises a flexible rubber flange that seals to the scale enclosure.

In the foregoing aspect, the system is adapted to maintain oxygen at a level of about 0.5% or less in at least pathways in which the product travels.

In the foregoing aspect, the glove box comprises three gloved openings, two gloved openings being disposed for access to the central region and one gloved opening being disposed for access to the disposal region.

In the foregoing aspect, the disposal region comprises a trash receptacle for receiving and retaining the pouch from the disposal region, and the door of the disposal region seals the disposal region from the trash receptacle when closed to thereby allow the trash receptacle to be emptied without exposing the glove box to ambient conditions.

In the foregoing aspect, the system is adapted to interface with a packaging machine selected from vertical form fill seal machines, horizontal form fill seal machines, horizontal flow wrappers, jar and/or can filling machines, tray filling machines, auger filling type machine, and the like.

In the foregoing aspect, the interface between the system and the packaging machine is sealed to ambient conditions.

In the foregoing aspect, the interface comprises one or more gassing elements.

In accordance with an aspect of the disclosure, a method for aseptic filling of a package with a product can include receiving sterilized product from a sterilization unit in a transfer receptacle; transferring the sterilized product from the transfer receptacle into a glove box while flowing inert gas over and/or through the sterilized product; transferring the sterilized product from the glove box to a hopper through an opening in the glove box while flowing inert gas over and/or through the sterilized product; flowing the sterilized product through the hopper to a feeder, wherein a flow of inert gas is maintained in the hopper during flow of the sterilized product; and transferring the sterilized product using the feeder to a funnel, through which the sterilized product flows to a scale, wherein an inert gas flow is maintained over, under, and/or through the sterilized product during transferring on the feeder and a flow of inert gas is maintained within the funnel.

In the foregoing method aspect, the flowing of inert gas maintains an oxygen level of 0.5% or less during flow of the product through the hopper, transfer of the product on the feeder, and flow of the product through the funnel to the scale.

In the foregoing method aspect, the scale comprising one or more gassing elements and the method further comprising flowing inert gas over the product during flow of the product through the scale to maintain an oxygen level of 0.5% or less during flow of the product through the scale.

In the foregoing method aspect, the sterilized product is provided as a pouch of sterilized product and the method further comprises opening the sterilized pouch of product to remove the sterilized product when the sterilized pouch is in the glove box.

In the foregoing method aspect, the glove box comprises a grate positioned over an opening providing communication between the glove box and the hopper, wherein the sterilized product is removed from the pouch and passed through the grate to flow to the hopper, and wherein the grate prevents the pouch from flowing through the hopper.

In the foregoing method aspect, wherein the glove box further comprises a disposal region, wherein the pouch is transferred to the disposal region after removing the sterilized product.

In the foregoing method aspect, the disposal region comprises a trash receptacle and a door that seals the trash receptacle from the glove box when the door is in the closed position, the method further comprising opening the door and transferring the pouch to the trash receptacle after the sterilized product is removed.

Any of the previously describe method aspect features can be combined together.

In accordance with an aspect of the disclosure, a method for bulk aseptic filling a package with a product can include loading product into a hopper through a product inlet wherein a flow of inert gas is maintain across the product inlet during loading; flowing the product through the hopper to a feeder, wherein a flow of inert gas is maintained over and/or through the product in the hopper and wherein a flow of inert gas is maintain over, through, and/or beneath the product in the feeder; transferring the product from the feeder to a funnel, wherein a flow of inert gas is maintained over the product within the funnel, the funnel being arranged to flow the product to a scale; maintaining a flow of inert gas of the product in the scale during weighing of the product into a bulk packaging amount; transferring the bulk packaging amount of product to a filling station for filling the product into a package; filling the bulk packaging amount of product into the package, wherein a flow of inert gas is maintained over the product during filling; and sealing the package. The flowing of inert gas throughout the system can maintain an oxygen level of 0.5% or less.

In accordance with an aspect of the disclosure a gassing element system for a combination weighing scale can include a frustoconically shaped dispersion feeder gassing element disposed at a first end of the system; one or more outer radial feeder gassing elements extending radially outward from the dispersion feeder gassing element; one or more feed hopper gassing elements positioned downstream of the outer radial feeder gassing elements and positioned to direct flow of gas to the one or more feed hoppers that transfer product to one or more weight buckets; one or more weigh bucket gassing elements disposed downstream of the one or more feed hopper gassing elements and positioned to direct flow of gas into the one or more weight buckets; one or more collating chute gassing elements disposed downstream of the one or more weight bucket gassing elements and positioned to radially direct flow of gas into a collating chute; a vertical collating chute gassing element, extending vertically upward from a second end of the system, opposite the first end of the system, and arranged to be disposed within and maintain flow of gas within the collating chute.

In accordance with an aspect, a combination weighing scale having a gassing element system can include a scale funnel disposed at a first end of the scale, the scale funnel comprising one or more gassing elements for maintaining a flow of gas within the scale funnel; a dispersion feeder disposed downstream of the scale funnel; a frustoconically shaped dispersion feeder gassing element disposed downstream of the funnel and positioned to direct a flow of gas to product disposed in the dispersion feeder; one or more radial feeders positioned to receive product from the dispersion feeder; one or more outer radial feeder gassing elements positioned to direct a flow of gas into the one or more radial feeders, the one or more radial feeder gassing elements being disposed radially outward from the frustoconically shaped dispersion feeder gassing element; one or more feeder hoppers disposed downstream of the one or more radial feeders to receive product from the one or more radial feeders; one or more feed hopper gassing elements positioned to direct a flow of gas into the one or more feed hoppers; one or more weigh buckets disposed downstream of the one or more feed hoppers to receive product from the one or more feed hoppers; one or more weigh bucket gassing elements positioned to direct a flow of gas into the one or more weight buckets; a collating chute for receiving products from the one or more weight buckets; a vertical gassing element disposed in the collating chute; and one or more collating chute gassing elements positioned to direct a radial flow of gas within the collating chute.

Any of the following scale and/or scale gassing system features can be combined.

In the foregoing scale gassing system aspect, the one or more of the outer radial feeder gassing elements, feed hopper gassing elements, and weigh bucket gassing elements are arranged to direct a flow of gas outwardly away from a central axis of the system.

In the foregoing scale gassing system aspect, wherein the collating chute gassing elements are arranged to direct a flow of gas radially about a central axis of the system.

The foregoing scale aspect can further include a plurality of radial feeders arranged radially about a central axis of the scale, each of the plurality of radial feeders having an outer radial feeder gassing element.

The foregoing scale aspect can further include a plurality of feed hoppers arranged radially about a central axis of the scale, each of the plurality of feed hoppers having a feeder hopper gassing element.

The foregoing scale aspect can further include a plurality of weigh buckets arranged radially about a central axis of the scale, each of the plurality of weight buckets having a weigh bucket gassing element.

The foregoing scale aspect can further include a plurality of collating chute gassing elements arrange radially around the vertical gassing elements, each of the plurality of collating chute gassing elements positioned to direct a flow of gas radially in the direction in which the collating chute gassing elements are arranged.

In the foregoing scale aspect, the one or more of the outer radial feeder gassing elements, feed hopper gassing elements, and weigh bucket gassing elements are arranged to direct a flow of gas outwardly away from a central axis of the scale.

The foregoing scale aspect can include a scale enclosure substantially enclosing an entirety of the scale and sealing the scale from ambient conditions.

In an aspect of the disclosure, a gassing element system for a combination weighing scale can include a frustoconically shaped dispersion feeder gassing element disposed at a first end of the system; one or more outer radial feeder gassing elements extending radially outward from the dispersion feeder gassing element; one or more weigh bucket gassing elements disposed downstream of the dispersion feeder gassing element and positioned to direct flow of gas into the one or more weigh buckets; one or more collating chute gassing elements disposed downstream of the one or more weight bucket gassing elements and positioned to radially direct flow of gas into a collating chute; a vertical collating chute gassing element, extending vertically upward from a second end of the system, opposite the first end of the system, and arranged to be disposed within and maintain flow of gas within the collating chute.

In accordance with an aspect of the disclosure, a system for aseptic filling of a package with a product can include a transfer receptacle having interior volume for receiving a sterilized product from a sterilization unit; a hopper positioned to receive the sterilized product from the transfer receptacle; a feeder positioned to receive the sterilized product from the hopper and transfer the product to a funnel; the funnel positioned to receive the product from the feeder and transfer the product to a scale; and a plurality of gassing elements positioned throughout the system to maintain a substantially constant flow of inert gas over and/or through the sterilized product as it flows through the system.

In the foregoing system, the plurality of gassing elements can include one or more gassing elements disposed in the transfer receptacle, one or more gassing elements disposed in the hopper, one or more gassing elements disposed in the feeder, and one or more gassing elements disposed in the funnel.

In the foregoing system, the one or more gassing elements disposed in the hopper can include a vertically mounted gassing element.

In the foregoing system, the one or more gassing elements disposed in the funnel can include a vertically mounted gassing element.

In the foregoing system, the one or more gassing elements disposed in the feeder can be disposed one or more of (i) above the product, (ii) below the product or (iii) in a flow path of the product through the feeder.

In the foregoing system, the system can include a combination weighing scale as described herein.

In the foregoing system, the scale can be in a scale enclosure sealed to ambient conditions.

In the foregoing system, the system can further include a conveying device for conveying the product from the sterilization unit to the transfer receptacle. The conveying device can include one or more gassing elements for maintaining a flow of gas over and/or through the product during conveying.

In accordance with an aspect of the disclosure, a system for aseptic processing of a product can include a hopper through which product can be loaded into the system, the hopper having a door that actuates between open and closed positions to expose an opening of the hopper for loading of the product and substantially sealing of the opening after loading, respectively; a feeder fluidly coupling the hopper to a funnel; a scale arranged to receive product from the funnel; a gassing assembly comprising at least one gassing element arranged in one or more of the hopper, the feeder, the funnel and the scale to maintain a flow of inert gas over and/or through the product as it flows through the system; an enclosure surrounding at least a portion of the hopper, the feeder, the funnel, and the scale; and a gas recirculation system comprising at least one recirculation element in fluid communication with at least recirculation exhaust and at least one recirculation filter, wherein the at least one recirculation element is arranged to maintain a flow of filtered gas within the enclosure, the at least one recirculation exhaust is arranged downstream of the at least one recirculation element to collect the filtered gas from within the enclosure, and the at least one filter is arranged to receive the collected filtered gas from the at least one exhaust, filter the collected filtered gas and return filtered gas to the at least one recirculation element for recirculation within the enclosure.

The system of the foregoing aspect can further include a pouch opening apparatus disposed at, within, or upstream of the hopper for opening a pouch of product and releasing the product contained within the pouch into the hopper. The pouch opening apparatus can include an actuating blade configured to actuate to cut a portion of the pouch, opening the pouch to release the product into the hopper and leaving the cut portion attached to the pouch.

What is claimed:

1. A system for aseptic processing of a product, comprising:
    one or more components for transporting the product through the system, the components comprising a hopper through which the product can be loaded into the system and one or more of a feeder, a weigh hopper, a funnel, a scale, and a filling station;
    an enclosure surrounding at least a portion of the one or more components;
    a gassing assembly comprising at least one gassing element disposed within one or more of the components to flow inert gas over and/or through the product within the one or more components; and
    a recirculation system comprising at least one recirculation element and at least one recirculation exhaust disposed downstream of the recirculation element, and a recirculation filter interposed between and in fluid communication with the at least one recirculation element and the at least one recirculation exhaust, wherein the recirculation system is configured to flow a filtered gas into the enclosure through the at least one recirculation element such that the filtered gas flows over the one or more components within the enclosure and is collected by the at least one recirculation exhaust, wherein the recirculation exhaust directs the collected gas to the filter, which filters the collected gas and directs the filtered gas to the at least one recirculation element for reintroduction into the enclosure.

2. The system of claim 1, wherein the one or more components further comprises a filling station for filling a package with the product.

3. The system of claim 1, wherein the recirculation filter is a HEPA filter.

4. The system of claim 1, wherein the hopper comprising a product inlet opening through which the product is loaded, the recirculation system further comprises a recirculation element disposed at a product inlet opening to generate a flow of inert gas from the recirculation system across the product inlet opening, and a recirculation exhaust arranged to collect the flow of inert gas from the recirculation element disposed at the product inlet opening, wherein the recirculation element and recirculation exhaust at the product inlet opening are in fluid communication with the filter such that the recirculation exhaust at the product inlet open directs the collected gas through the filter, which filters the collected gas and directs it to the recirculation element at the product inlet opening and the at least one recirculation element for directing the filtered gas into the enclosure.

5. The system of claim 1, wherein the hopper further comprises a UV radiation source arranged to expose the product and/or a pouch of product present from which the product is released into the hopper to UV radiation at the product inlet.

6. The system of claim 1, wherein the gassing element disposed at the product inlet flows inert gas laterally across the product inlet such that product must cross the flow of inert gas prior to entry into the hopper.

7. The system of claim 1, wherein the hopper further comprises a vertically mounted gassing element extending from the product inlet to the product outlet.

8. The system of claim 1, wherein the feeder is a vibrating feeder.

9. The system of claim 1, wherein the one or more gassing elements disposed in the feeder are disposed one or more of (i) above the product, (ii) below the product, and (iii) in a flow path of the product through the feeder.

10. The system of claim 1, wherein the enclosure is sealed around the hopper.

11. The system of claim 1, further comprising legs upon which the enclosure is disposed, wherein the enclosure is moveable between a first position in which the enclosure is disposed adjacent the legs and a second position in which the enclosure is shifted away from the legs.

12. The system of claim 1, wherein the gassing assembly controls the flow of gas to the one or more gassing elements, and comprises an inert gas input, a sterilization fluid input, a HEPA filter downstream of the inert gas input and the sterilization gas input, and a gas rail downstream of the HEPA filter to distribute the gas to the one or more gassing elements.

\* \* \* \* \*